United States Patent
Lee et al.

(10) Patent No.: US 10,906,532 B2
(45) Date of Patent: Feb. 2, 2021

(54) AUTONOMOUS VEHICLE AND METHOD FOR CONTROLLING THE SAME

(71) Applicant: LG ELECTRONICS INC., Seoul (KR)

(72) Inventors: Seongho Lee, Seoul (KR); Taeho Noh, Seoul (KR); Jaedoo Go, Seoul (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 16/101,855

(22) Filed: Aug. 13, 2018

(65) Prior Publication Data
US 2019/0111916 A1   Apr. 18, 2019

(30) Foreign Application Priority Data
Oct. 12, 2017   (KR) .......................... 10-2017-0132605

(51) Int. Cl.
*B60W 30/06* (2006.01)
*G06K 9/00* (2006.01)
(Continued)

(52) U.S. Cl.
CPC ......... *B60W 30/06* (2013.01); *B62D 15/0285* (2013.01); *G05D 1/0061* (2013.01);
(Continued)

(58) Field of Classification Search
CPC ............. B60W 30/06; B60W 2720/10; B60W 2720/28; B60W 2552/05; B60W 2552/30;
(Continued)

(56) References Cited

U.S. PATENT DOCUMENTS

| | | | |
|---|---|---|---|
| 2005/0195095 A1* | 9/2005 | Kato | G08G 1/143 340/932.2 |
| 2011/0022269 A1* | 1/2011 | Nakazono | G08G 1/14 701/41 |

(Continued)

FOREIGN PATENT DOCUMENTS

| | | | |
|---|---|---|---|
| CN | 103247194 | * | 8/2013 |
| DE | 102015201272 | | 7/2016 |

(Continued)

OTHER PUBLICATIONS

Extended European Search Report in European Appln. No. 18185982.8, dated Feb. 13, 2019, 8 pages.

(Continued)

*Primary Examiner* — Muhammad Shafi
(74) *Attorney, Agent, or Firm* — Fish & Richardson P.C.

(57) ABSTRACT

A method for autonomous driving includes detecting an environment around a vehicle, autonomously driving the vehicle based on the detected environment, determining whether a target parking position has been set, determining an autonomous driving mode of the vehicle from among a first mode for controlling a speed of the vehicle to move the vehicle to the target parking position and a second mode for searching for an available parking position, based on a determination of the autonomous driving mode from among the first and second modes, autonomously driving the vehicle in one of the first and second modes, based on autonomously driving the vehicle in one of the first and second modes, determining whether a condition is satisfied, and based on a determination that the condition is satisfied, switching the autonomous driving mode to the other of the first and second modes.

18 Claims, 24 Drawing Sheets

(51) Int. Cl.
*G08G 1/14* (2006.01)
*B62D 15/02* (2006.01)
*G08G 1/16* (2006.01)
*G05D 1/00* (2006.01)
*G01S 15/931* (2020.01)

(52) U.S. Cl.
CPC ....... *G05D 1/0088* (2013.01); *G06K 9/00812* (2013.01); *G08G 1/14* (2013.01); *G08G 1/143* (2013.01); *G08G 1/168* (2013.01); *B60K 2370/175* (2019.05); *B60W 2552/05* (2020.02); *B60W 2552/30* (2020.02); *B60W 2720/10* (2013.01); *B60W 2720/28* (2013.01); *G01S 2015/933* (2013.01); *G05D 2201/0213* (2013.01)

(58) Field of Classification Search
CPC ...... B62D 15/0285; G08G 1/14; G08G 1/168; G08G 1/143; G06K 9/00812; B60K 2370/175; G05D 2201/0213; G05D 1/0214; G05D 1/0221; G05D 1/0223; G05D 1/0236; G05D 1/024; G05D 1/0242; G05D 1/0251; G05D 1/0255; G05D 1/0257; G05D 1/0263; G05D 1/0276; G05D 1/0278; G05D 1/028; G05D 1/0061; G05D 1/0088; G01S 13/00; G01S 2015/933
USPC .......................................................... 701/23
See application file for complete search history.

(56) References Cited

U.S. PATENT DOCUMENTS

| | | |
|---|---|---|
| 2015/0012202 A1 | 1/2015 | Moore et al. |
| 2015/0039173 A1* | 2/2015 | Beaurepaire ....... B62D 15/0285 701/23 |
| 2015/0367845 A1* | 12/2015 | Sannodo ............... B60W 30/08 701/23 |
| 2016/0358474 A1* | 12/2016 | Uppal ................ G06K 9/00812 |
| 2017/0200367 A1* | 7/2017 | Mielenz ............... G05D 1/0246 |
| 2018/0082588 A1* | 3/2018 | Hoffman, Jr. .......... G08G 1/166 |

FOREIGN PATENT DOCUMENTS

| | | |
|---|---|---|
| DE | 102016013182 | 6/2017 |
| JP | H09171594 | 6/1997 |
| JP | 2008137442 | 6/2008 |
| JP | 2014008939 | 1/2014 |
| JP | 2014144709 | 8/2014 |
| JP | 2016016681 | 2/2016 |
| KR | 20170070480 | 6/2017 |
| WO | WO2017072894 | 5/2017 |

OTHER PUBLICATIONS

Bogoslavskyi et al., "Where to Park? Minimizing the Expected Time to Find a Parking Space," XP055543491, 2015 IEEE International Conference on Robotics and Automation (ICRA), May 2015, 6 pages.
Korean Notice of Allowance in Korean Application No. 10-2017-0132605, dated Jan. 29, 2020, 4 pages (with English translation).
European Office Action in European Application No. 18185982.8, dated Mar. 12, 2020, 5 pages.
Stanek et al., "Junior 3: A Test Platform for Advanced Driver Assistance Systems," TuB1.24, 2010 IEEE Intelligent Vehicles Symposium, University of California, San Diego, CA, USA, dated Jun. 21-24, 2010, 7 pages, XP031732158.

* cited by examiner

AUTONOMOUS VEHICLE AND METHOD FOR CONTROLLING THE SAME

CROSS-REFERENCE TO RELATED APPLICATIONS

Pursuant to 35 U.S.C. § 119(a), this application claims the earlier filing date and right of priority to Korean Patent Application No. 10-2017-0132605, filed on Oct. 12, 2017, in the Korean Intellectual Property Office, the contents of which are incorporated herein by reference in its entirety.

FIELD

The present disclosure relates to an autonomous vehicle and method for controlling the same, and more particularly, to a vehicle for autonomous parking and method for controlling the same.

BACKGROUND

A vehicle is an apparatus that can transport a user in a desired direction. For example, the vehicle includes an automobile.

Vehicles may be equipped with sensors and electronic devices that can provide user convenience. For example, research has been actively conducted on advanced driver assistance systems (ADAS) to provide user convenience for various operations in driving. In some examples, autonomous vehicles may control some operations of a vehicle without a user's active control.

An autonomous vehicle may be configured to be autonomously driven without user's manual operation until the vehicle arrives at the intended destination. After arrival at the destination, the autonomous vehicle may be parked at the destination or a nearby parking lot. Thus, autonomous driving may include functions for not only driving to the destination but also parking.

In some cases, autonomous driving technologies may not fully replace manual parking by a user. In some examples, an autonomous vehicle may be configured to park in an empty space without user intervention. In other examples, as part of autonomous driving, parking may be controlled to be performed efficiently and accurately even with changes in surrounding environments and conditions actively.

SUMMARY

One object of the present disclosure is to provide a vehicle that can perform autonomous parking in an adaptive manner and a method for controlling the same.

Another object of the present disclosure is to provide a vehicle that can perform efficient and accurate parking and a method for controlling the same.

It will be appreciated by persons skilled in the art that the objects that could be achieved with the present disclosure are not limited to what has been particularly described hereinabove and the above and other objects that the present disclosure could achieve will be more clearly understood from the following detailed description.

According to one aspect of the subject matter described in this application, a method for controlling autonomous driving of a vehicle includes detecting, by a sensor of the vehicle, an environment around the vehicle, autonomously driving, by at least one processor connected to the vehicle, the vehicle based on the detected environment, determining whether a target parking position has been set, based on a determination whether the target parking position has been set, determining, by the at least one processor, an autonomous driving mode of the vehicle from among a first mode for controlling a speed of the vehicle to move the vehicle to the target parking position and a second mode for controlling a movement path of the vehicle to search for an available parking position, based on a determination of the autonomous driving mode from among the first mode and the second mode, autonomously driving, by the at least one processor, the vehicle in one of the first and second modes, based on autonomously driving the vehicle in one of the first and second modes, determining whether a predetermined condition is satisfied, and based on a determination that the predetermined condition is satisfied, switching, by the at least one processor, the autonomous driving mode to the other of the first and second modes.

Implementations according to this aspect may include one or more of the following features. For example, determining the autonomous driving mode from among the first mode and the second mode may include based on a determination that the target parking position has been set, determining the first mode as the autonomous driving mode, and based on a determination that the target parking position has not been set, determining the second mode as the autonomous driving mode. The target parking position may include a first parking space that is currently available for parking the vehicle and a second parking space that is anticipated to be available for parking the vehicle.

In some implementations, autonomously driving the vehicle in one of the first and second modes may include autonomously driving the vehicle in one of the first mode based on a first driving speed and a first steering operation, and the second mode based on a second driving speed that is different from the first driving speed and a second steering operation that is different from the first steering operation. In some examples, autonomously driving the vehicle in the first mode may include determining a parking path to the target parking position, and autonomously driving the vehicle along the parking path based on changing the speed of the vehicle according to a change of a steering operation of the vehicle.

In some implementations, autonomously driving the vehicle in the first mode may include determining a parking path to the target parking position, and autonomously driving the vehicle along the parking path based on changing the speed of the vehicle according to a width of the parking path. In some examples, autonomously driving the vehicle based on changing the speed of the vehicle according to the width of the parking path may include increasing the speed of the vehicle based on an increase of the width of the parking path to the target parking position, and decreasing the speed of the vehicle based on a decrease of the width of the parking path to the target parking position.

In some implementations, autonomously driving the vehicle in the first mode may include determining a parking path to the target parking position, determining whether a width of the parking path is less than a reference width, autonomously driving the vehicle along the parking path based on a steering operation of the vehicle, based on maintaining the steering operation of the vehicle, autonomously driving the vehicle at a first speed, based on maintaining the steering operation of the vehicle and based on a determination that the width of the parking path is less than the reference width, autonomously driving the vehicle at a second speed that is less than the first speed, and based on a change of the steering operation of the vehicle, driving the vehicle at a third speed that is less than the first and second speeds.

In some implementations, autonomously driving the vehicle in the first mode may include searching, by the sensor, for available parking spaces that are located on a way to the target parking position. In some examples, autonomously driving the vehicle in the second mode may include autonomously driving the vehicle along a side of parking spaces that are located within a detection range of the sensor. In some examples, autonomously driving the vehicle in the second mode may include determining whether parking spaces are present at a first side of the vehicle and a second side of the vehicle, and based on a determination that the parking spaces are present at the first and second sides of the vehicle, autonomously driving the vehicle based on alternating the movement path of the vehicle between a first path that is closer to parking spaces at the first side of the vehicle and a second path that is closer to parking spaces at the second side of the vehicle.

In some implementations, autonomously driving the vehicle in the second mode may include determining whether parking spaces are present at a first side of the vehicle and a second side of the vehicle, based on a determination that the parking spaces are present at both of the first and second sides of the vehicle, determining whether the parking spaces at both of the first and second sides of the vehicle are within in a detection range of the sensor, and based on a determination that the parking spaces at both of the first and second sides of the vehicle are within the detection range of the sensor, maintaining a steering operation of the vehicle while autonomously driving the vehicle.

In some implementations, switching the autonomous driving mode may include based on satisfaction of a first condition in which the target parking position is unavailable for parking the vehicle, switching the autonomous driving mode from the first mode to the second mode, and based on satisfaction of a second condition in which the target parking position is available for parking the vehicle, switching the autonomous driving mode from the second mode to the first mode. In some examples, the first condition may include at least one of a condition in which the target parking position is occupied by another object, a condition in which a parking path to the target parking position is unavailable, a condition in which a number of attempts for parking the vehicle at the target parking position is outside of a predetermined number of times, or a condition in which a period of time elapsed for attempts for parking the vehicle at the target parking position is outside of a predetermined period of time.

In some implementations, the second condition may include at least one of a detection of an empty space at the target parking position, or a designation of a predetermined parking space at the target parking position. In some examples, the second condition further may include a detection of a potential parking space that is anticipated to be available for parking the vehicle. The potential parking space may include at least one of a parking space from which another vehicle is currently leaving or a parking space that is anticipated to be available within a wait time. In some examples, switching the autonomous driving mode further may include based on a detection of the potential parking space before switching the autonomous driving mode from the second mode to the first mode, orienting the vehicle to the potential parking space to include the potential parking space in a detection range of the sensor.

In some implementations, autonomously driving the vehicle in the second mode may include stopping the vehicle around the potential parking space for a predetermined time, and determining whether the potential parking space is available within the predetermined time, based on a determination that the potential parking space is unavailable within the predetermined time, restarting autonomously driving the vehicle along a predetermined path to search for another parking space.

In some implementations, the method may further include based on a determination that the target parking position has been set, determining whether the vehicle is located within a distance from the target parking position, and based on a determination that the vehicle is located within the distance from the target parking position, autonomously parking the vehicle at the target parking position without autonomously driving the vehicle in the first mode.

Details of examples will be described in the following with reference to the accompanying drawings.

BRIEF DESCRIPTION OF THE DRAWINGS

The present application will become more fully understood from the detailed description given herein below and the accompanying drawings, which are given by illustration only, and thus are not limitative of the present application.

DETAILED DESCRIPTION

A vehicle as described in this specification may include, but is not limited to, an automobile and a motorcycle. Hereinafter, a description will be given based on an automobile, for instance.

A vehicle as described in this specification may include various types of an internal combustion engine vehicle including, but not limited to, an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
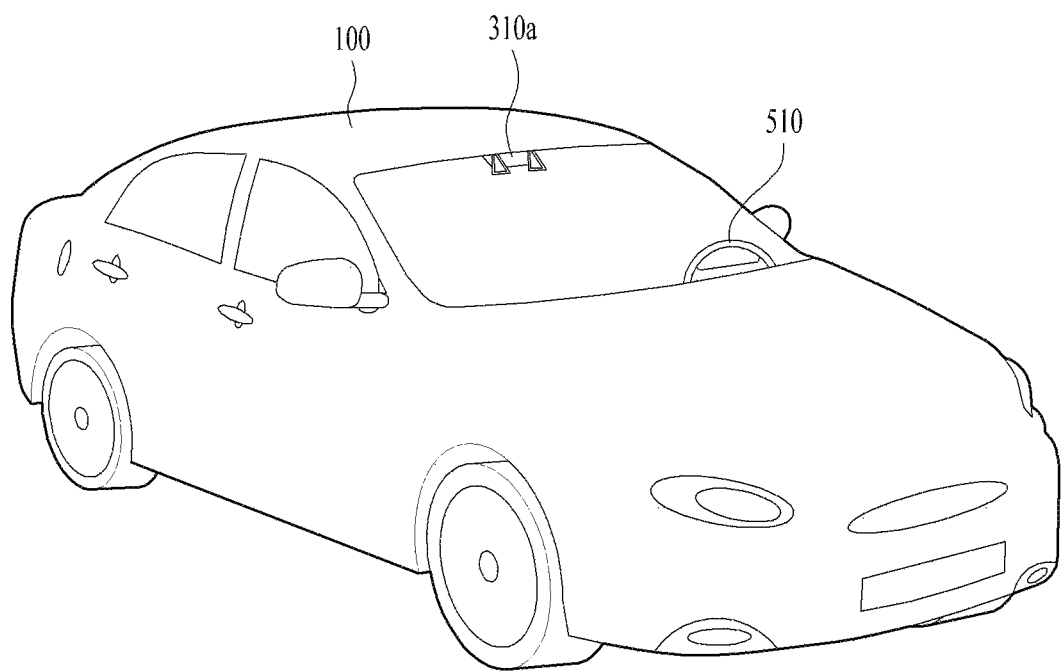
FIG. 1 is a view illustrating an example external appearance of an example vehicle.
Figure 1:
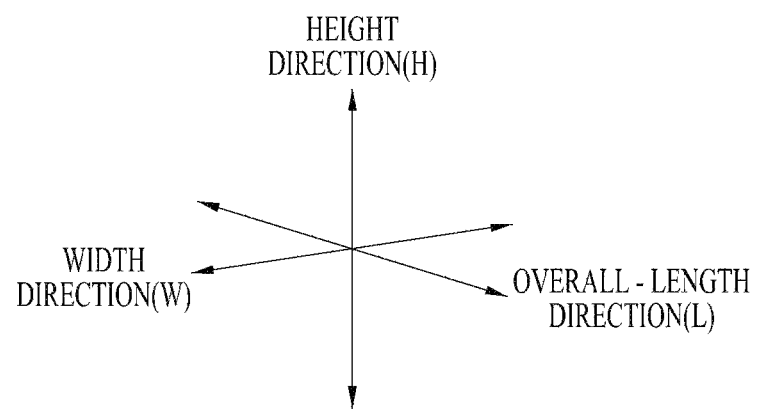
Figure 2:
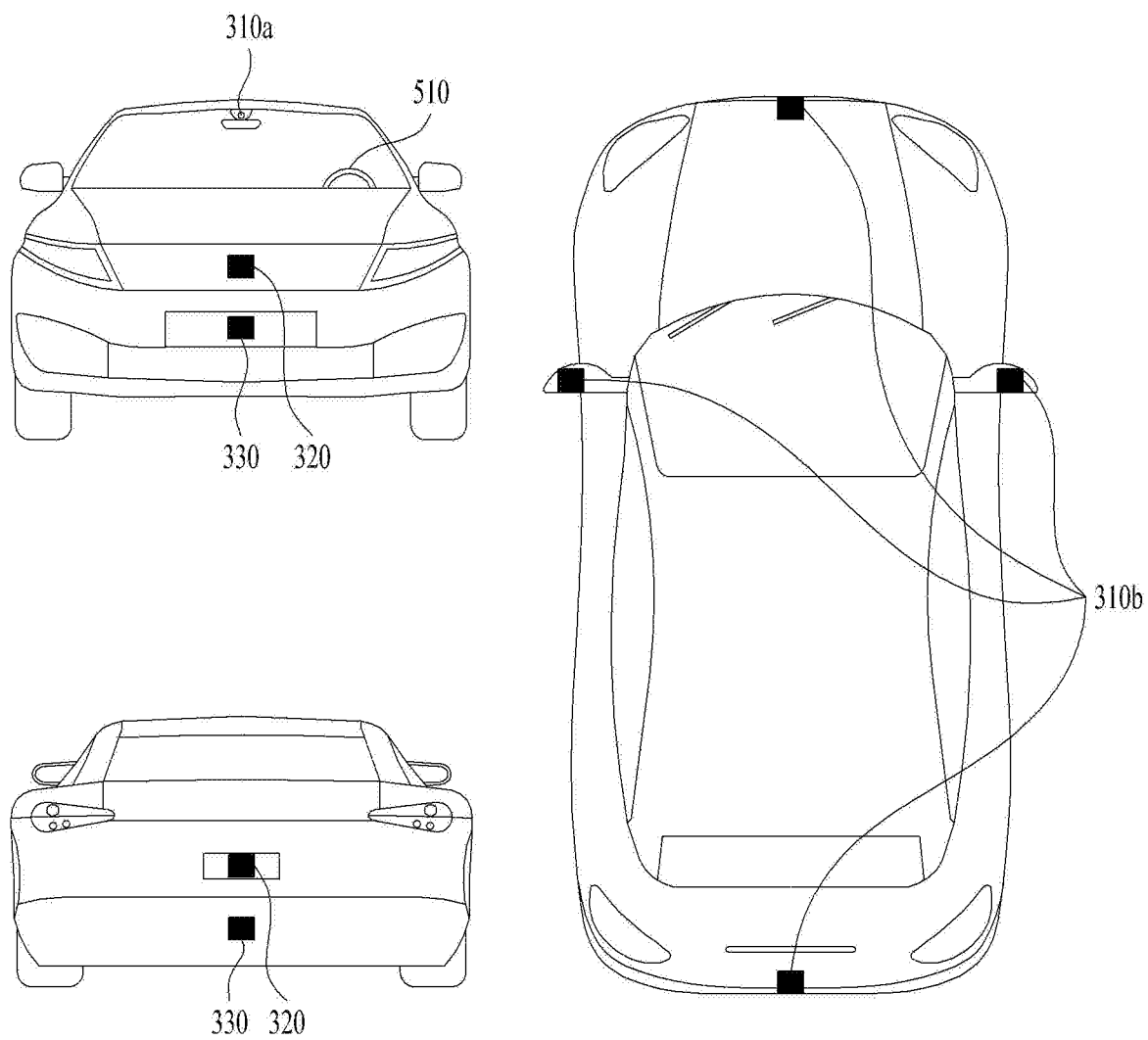
FIG. 2 illustrates different views illustrating example external appearances of an example vehicle at different angles.
Figure 3:
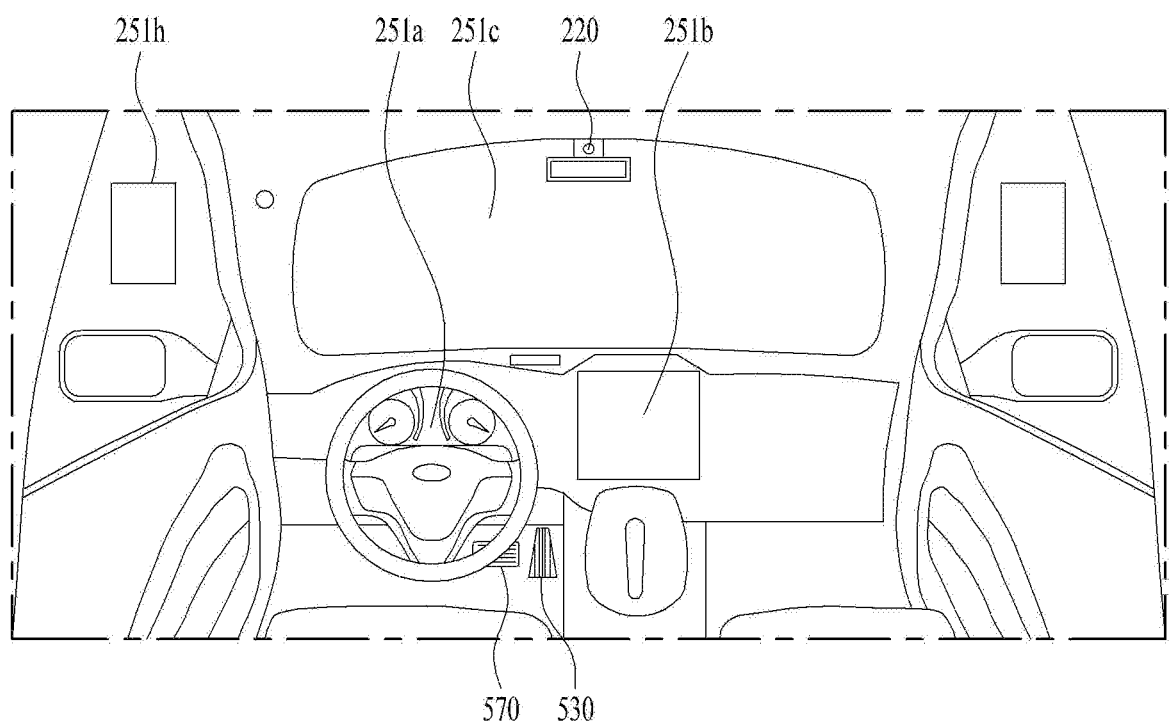
FIGS. 3 and 4 are views illustrating example interiors of an example vehicle.
Figure 4:
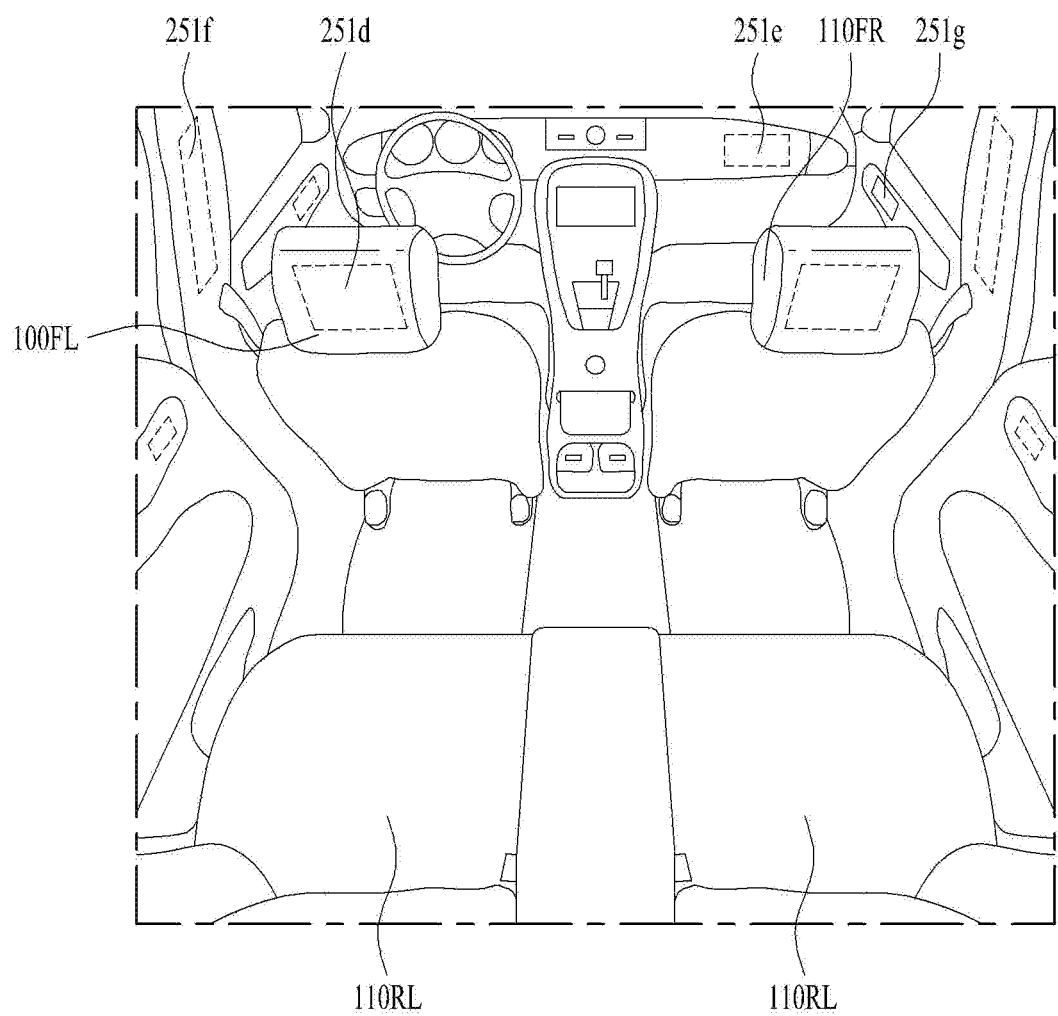
Figure 5:
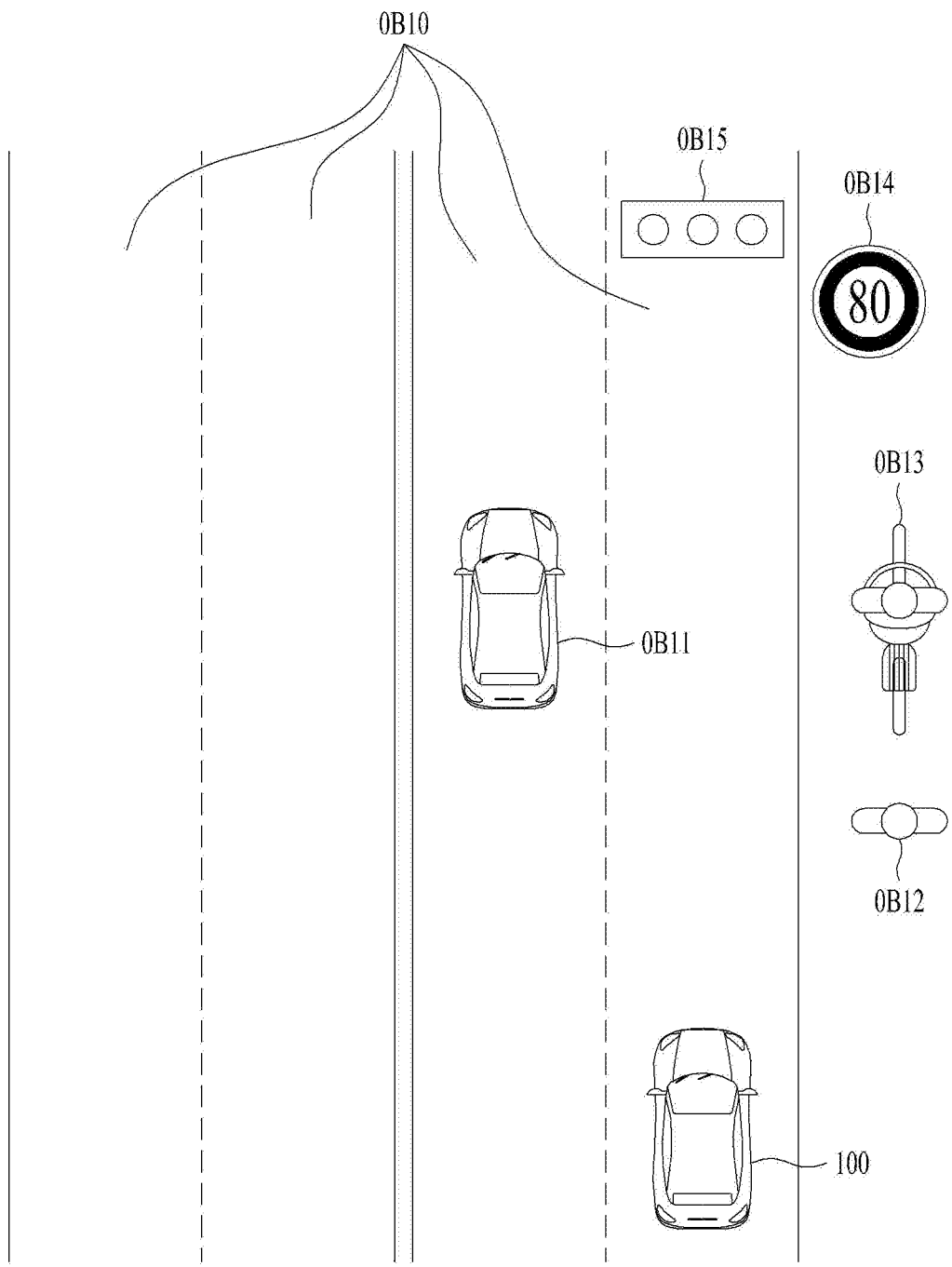
FIGS. 5 and 6 are views illustrating example objects around an example vehicle.
Figure 6:
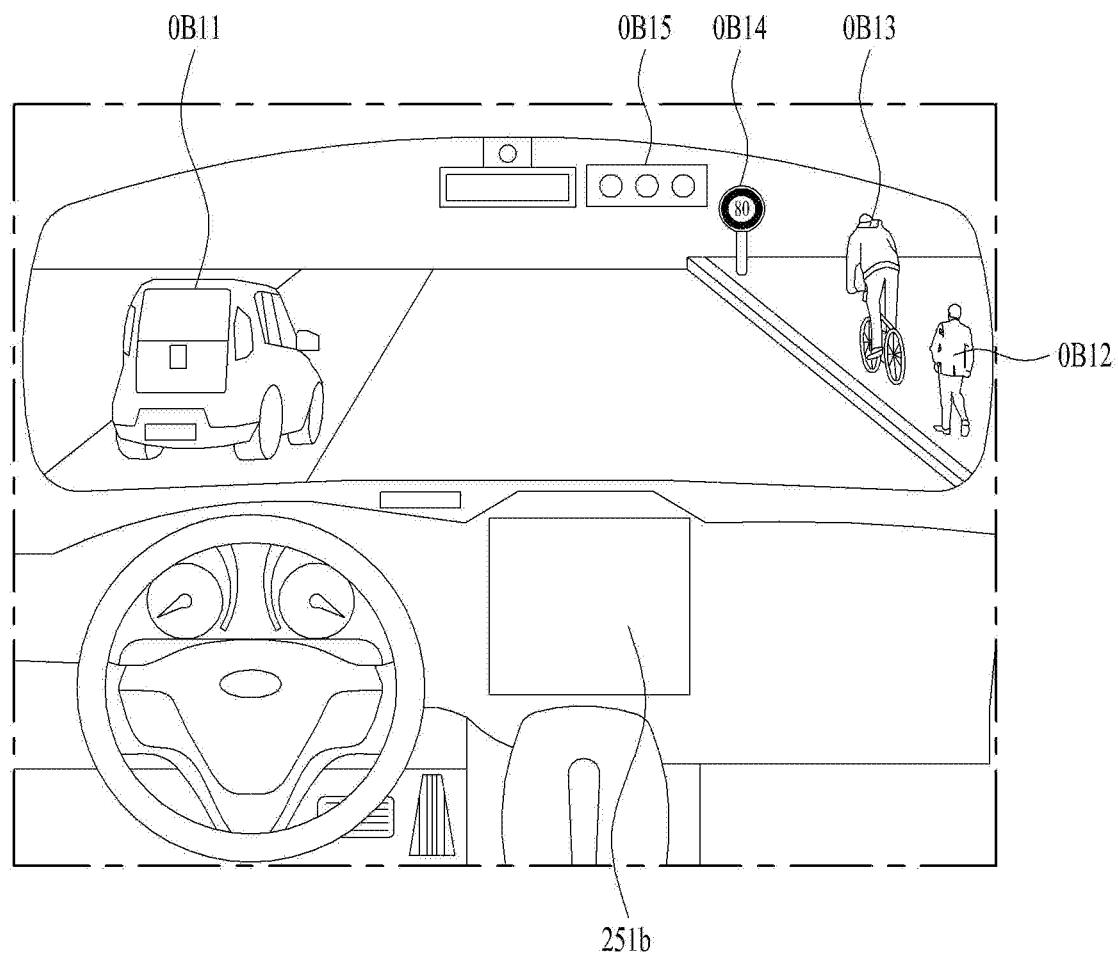
Figure 7:
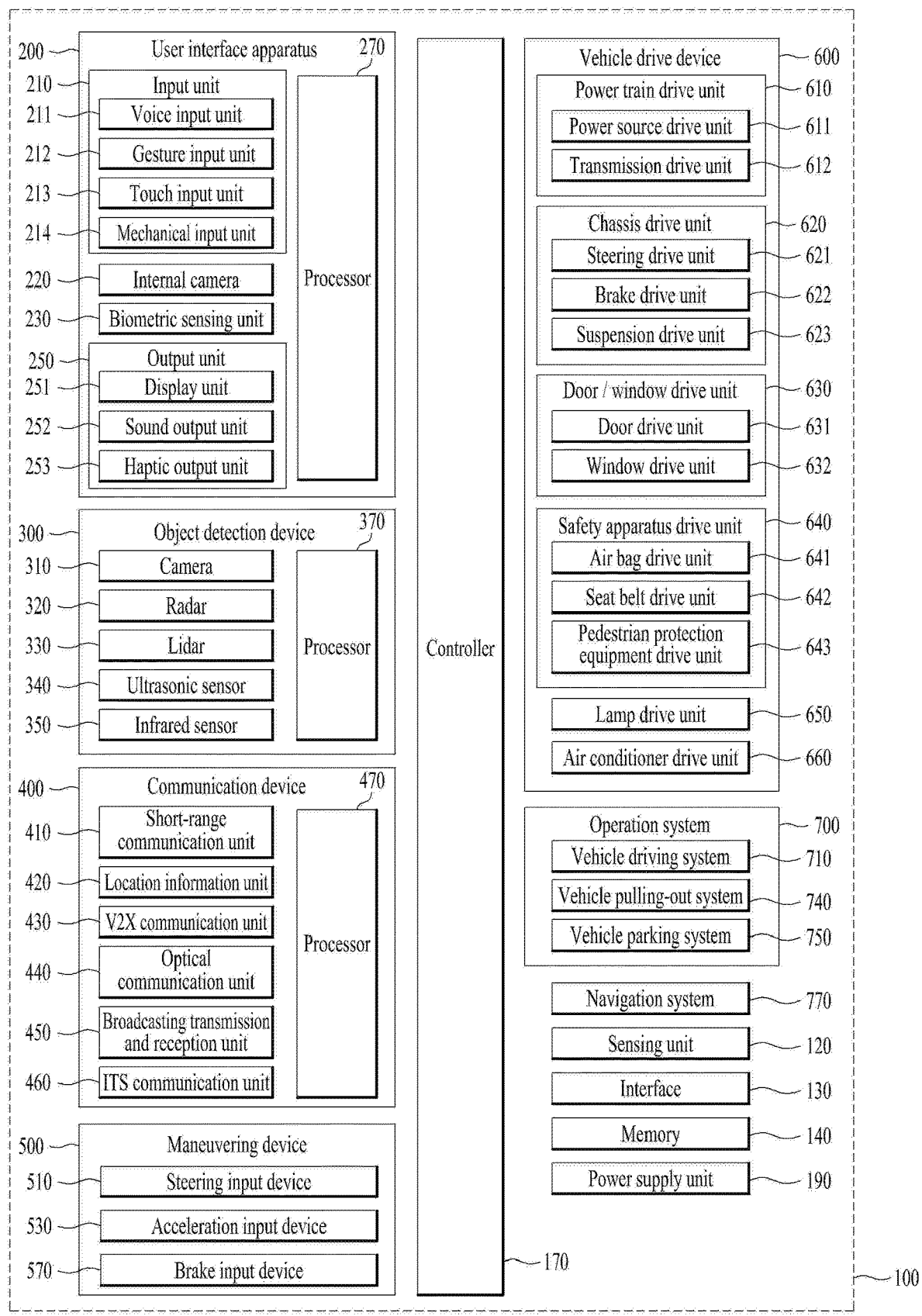
FIG. 7 is a block diagram illustrating example components of an example vehicle.

FIG. 1 illustrates an example external appearance of an example vehicle, FIG. 2 illustrates an example vehicle from different angles, FIGS. 3 and 4 illustrate example internal configurations of an example vehicle, FIGS. 5 and 6 illustrate example objects around an example vehicle, and FIG. 7 is a block diagram illustrating example components of an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" is the length from the front end to the rear end of the vehicle 100, the term "overall width" is the width of the vehicle 100, and the term "overall height" means the height from the bottom of the wheel to the roof. In the following description, the term "overall length direction L" may be the reference direction for the measurement of the overall length of the vehicle 100, the term "overall width direction W" may mean the reference direction for the measurement of the overall width of the vehicle 100, and the term "overall height direction H" may be the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some examples, the vehicle 100 may further include other components in addition to the aforementioned components, or may not include some of the aforementioned components.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some examples, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some examples, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some examples, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some examples, the touch input unit 210 may be integrated with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some examples, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some implementations, the user interface device 200 may be referred to as a display device for vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a LIDAR 330, an ultrasonic sensor 340, an infrared sensor 350, and a processor 370. Each component of the object detection device 300 may be separated from or integrated with the sensing unit 120, structurally or operatively.

In some examples, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The LIDAR 330 may include a laser transmission unit and a laser reception unit. The LIDAR 330 may be implemented by the TOF scheme or the phase-shift scheme.

The LIDAR 330 may be implemented as a drive type LIDAR or a non-drive type LIDAR.

When implemented as the drive type LIDAR, the LIDAR 330 may rotate by a motor and detect an object in the vicinity of the vehicle 100.

When implemented as the non-drive type LIDAR, the LIDAR 330 may utilize a light steering technique to detect an object located within a predetermined distance from the vehicle 100.

The LIDAR 330 may detect an object through the medium of laser light by employing the TOF scheme or the phase-shift scheme, and may detect a location of the detected object, the distance to the detected object, and the speed relative to the detected object.

The LIDAR 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the LIDAR 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the LIDAR 330, the ultrasonic sensor 340, and the infrared sensor 350 in the memory 140.

Each step of the learning mode based on analysis of stored data, and an operating mode following the learning mode will be described later in detail in relation to the operation system 700.

According to an example, the object detection device 300 may include a plurality of processors 370 or no processor 370. For example, the camera 310, the radar 320, the LIDAR 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some examples, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some examples, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some examples, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some examples, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some examples, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some examples, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power train drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some examples, the operation system 700 may further include other components in addition to the aforementioned components, or may not include some of the aforementioned component.

In some implementations, the operation system 700 may include a processor. Each unit of the operation system 700 may include its own processor.

In some implementations, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the afore-described manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the afore-described autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

In some examples, the processor of the operation system 700 may drive the vehicle 100 along the learned driving route by controlling the vehicle driving system 710 in the operating mode.

In some examples, the processor of the operation system 700 may pull out the vehicle 100 from the learned parking space by controlling the vehicle pulling-out system 740 in the operating mode.

In some examples, the processor of the operation system 700 may park the vehicle 100 in the learned parking space by controlling the vehicle parking system 750 in the operating mode.

In some implementations, in some examples, in a case where the operation system 700 is implemented as software, the operation system 700 may be a subordinate concept of the controller 170.

In some implementations, in some examples, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

In some examples, the driving system 710 may include a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some examples, the navigation system 770 may update pre-stored information by receiving information from an external device through the communication device 400.

In some examples, the navigation system 770 may be classified as an element of the user interface device 200.

As described above, a vehicle can be autonomously driven without user's manual operation by using the configurations described with reference to FIGS. 1 to 7, and such autonomous driving may include autonomous parking of the vehicle at a prescribed destination. However, surrounding environments and parking conditions could be changed in real time during autonomous parking, and thus it is necessary to precisely control autonomous parking so as to actively cope with changing environments and conditions to obtain parking results as efficient as manual parking. To this end, an autonomous driving and parking method for the vehicle 100 described with reference to FIGS. 1 to 7 has been developed, and the method will be described with reference to the accompanying drawings besides FIGS. 1 to 7. Unless mentioned otherwise, the configurations described with reference to FIGS. 1 to 7 can be included and referred to in the following control method using the corresponding components and drawings thereof. For example, the operation of the object detection device 300 described above with reference to FIGS. 1 to 7 can be equally applied to the relevant operation of the control method where the detection device 300 can be applied. Further, the control method according to the present disclosure is not only for the vehicle 100 described with reference to FIGS. 1 to 7. That is, the control method according to the present disclosure can be applied to all types of transportation as well as the vehicle 100, and it should be understood by those skilled in the art that other variations and modifications various other modifications may be made without departing from the scope of the disclosure.

In addition, the control method, which will be explained in the following, can control the elements described in FIG. 7 or operations of the various devices and units, and provide intended functions based on the operations. Thus, the operations and functions related to the control method should be considered not only as the features of the corresponding relevant structural elements but also as the features of the control method. For example, the control unit or processor 170 can be called various names such as a controller, a controlling device, and the like, and it can control various elements of the vehicle 100 to perform a prescribed operation.

In some examples, although some elements may have dedicated independent control units or processors for performing specific steps as described above, these elements can be controlled by the control unit 170 in performing the overall control method. In other words, the control unit 170 can be defined as the comprehensive and collective element for all components configured to control operations of the vehicle 100. For these reasons, the following steps may be performed by the controller 170 even though this is not explicitly mentioned. Additionally, detailed features of the following steps should be considered as the features of the control unit 170 except features that can be explicitly considered as those of a specific element.

Figure 8:
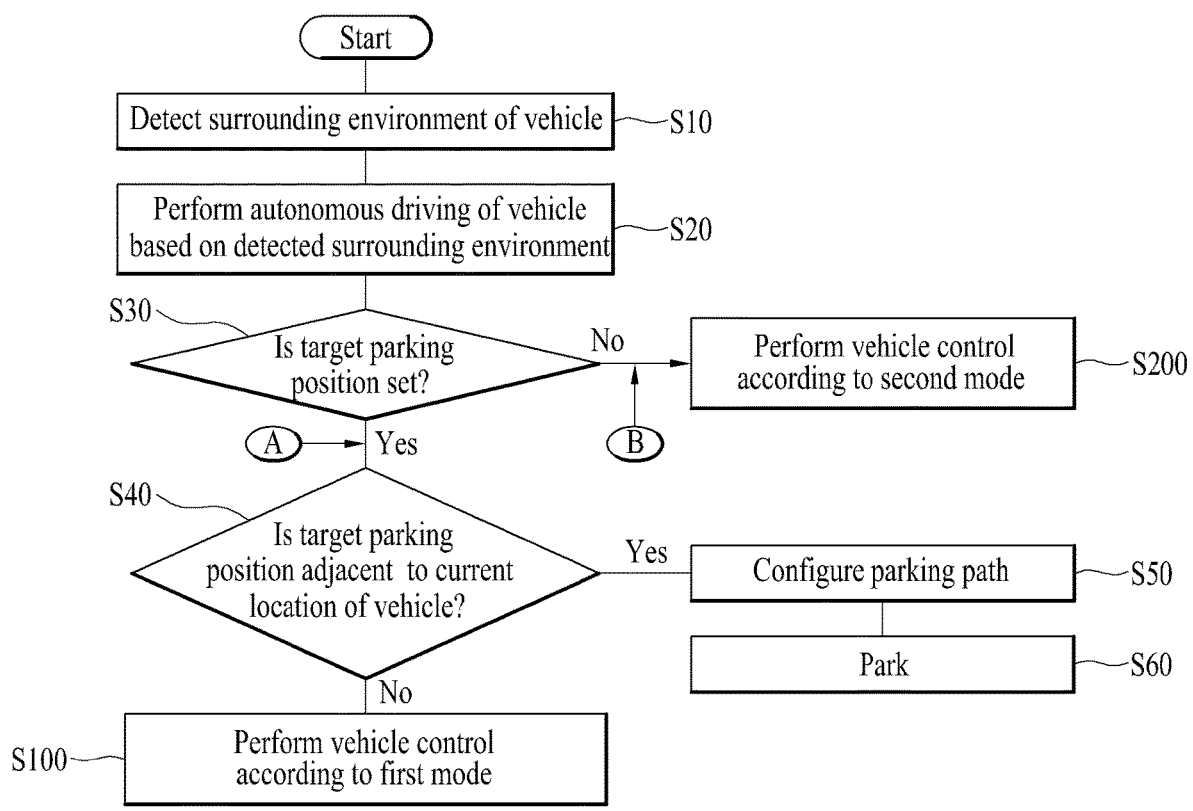
FIG. 8 is a flowchart illustrating an example autonomous parking method.
Figure 9:
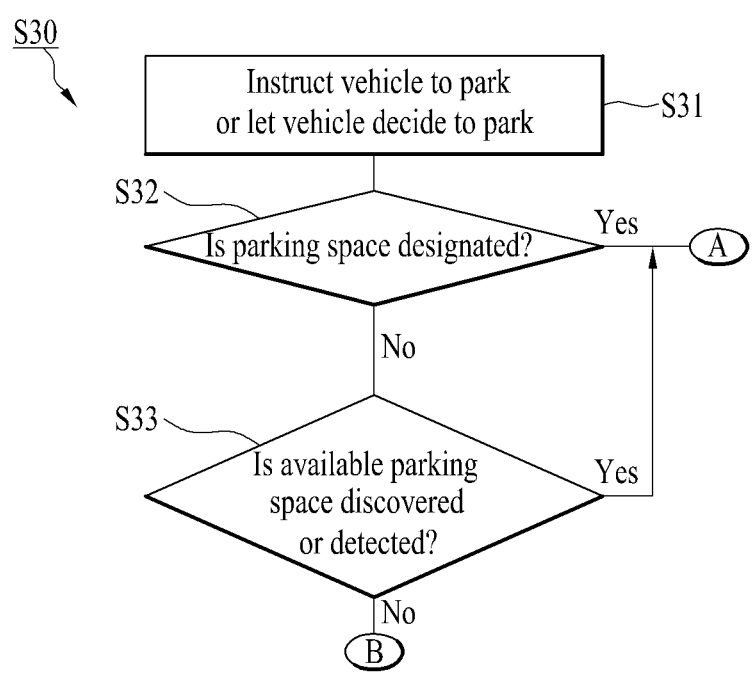
FIG. 9 is a flowchart illustrating an example detailed process of the target parking position step of FIG. 8.

FIG. 8 is a flowchart illustrating an example autonomous parking method for an autonomous vehicle, and FIG. 9 is a flowchart illustrating in detail the example target parking position step of FIG. 8. The overall features of the control method according to the present disclosure will be described with reference to FIGS. 8 and 9. Since the vehicle 100 has the capability of performing autonomous driving without user's manipulation as described in FIGS. 1 to 7, the steps of the control method, which will be described in the following, can be performed while a user is in the vehicle 100 or not. In addition, while the control method of the present disclosure is performed, the user can get into or out of the vehicle 100 at any time.

Although the control method according to the present disclosure is basically configured for autonomous parking of the vehicle, autonomous parking can be performed as part of autonomous driving or separately from the autonomous driving. Thus, the control method of the present disclosure can be generally considered as a control for autonomous driving or, on the other hand, as control specified for autonomous parking. However, in any cases, information on surrounding environments may be required to control vehicle driving or parking without user's manipulation. To this end, first the vehicle 100 can detect its surrounding environment [S10]. In the detection step S10, the vehicle 100 can detect the surrounding environment, e.g., roads and surrounding obstacles using a sensor.

For example, the object detection device 300 described in FIGS. 1 to 7 can be used as such a sensor. In addition, for autonomous driving or parking, information on a driving state of the vehicle, e.g., information on the current location, speed, steering, etc. may be required together. Thus, in the detection step S10, the state information of the vehicle can be detected using the sensing unit 120. Since the configurations and operations of the object detection device 300 and sensing unit 120 have been described in detail with reference to FIGS. 1 to 7, the description thereof will be omitted. Since the surrounding environment information is basically required for autonomous driving and parking as mentioned in the foregoing description, the detection step [S10], at least detection of the surrounding environment can be continuously performed while the control method according to the present disclosure is performed. For the same reason, the vehicle state information can be continuously obtained until autonomous driving and parking is terminated.

Based on the surrounding environment detected in the detection step [S10], the vehicle 100 can be driven autonomously [S20]. The driving step S20 can be performed under control of the control unit 170 using the operation system 700 as described above in FIGS. 1 to 7. In addition, if necessary, a path for autonomous driving can be configured by the operation system 700. As described above, all operations for autonomous driving performed by the vehicle 100 can be controlled by the control unit 170. The following steps and detail operations thereof may be performed by the control unit 170. For example, the following conditions for autonomous driving and parking may be detected by a sensor, and the detected information including received and stored information may be determined and configured by the control unit 170.

Figure 11:
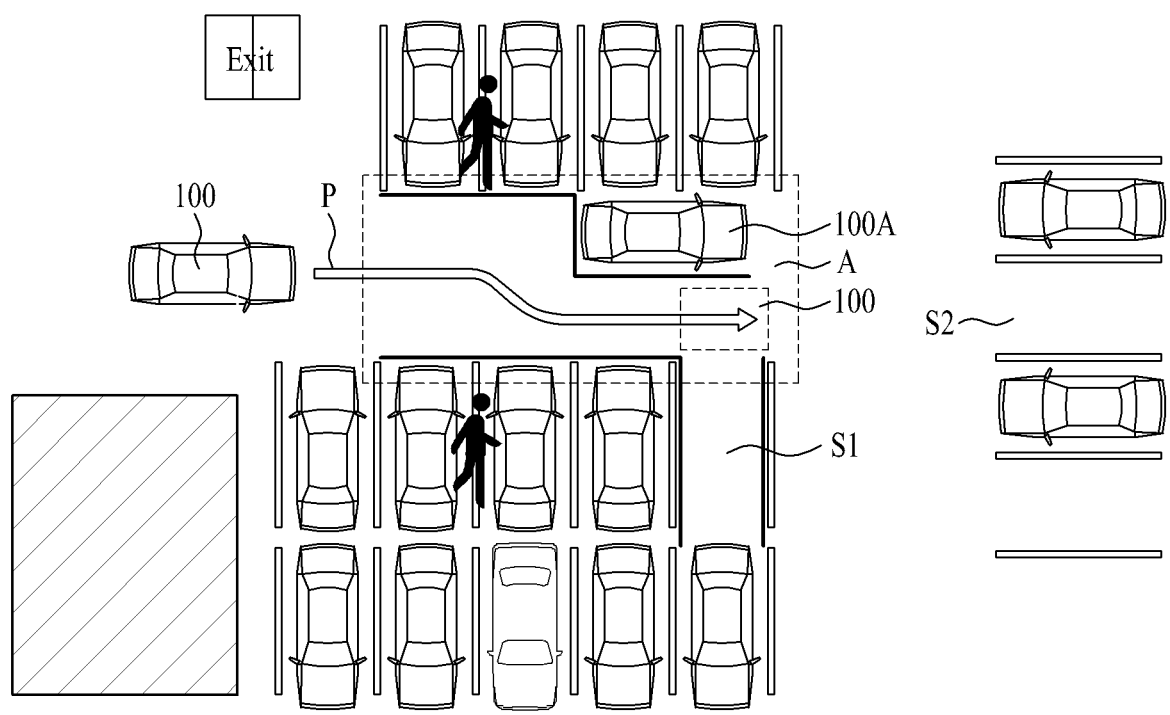
FIG. 11 is a schematic diagram illustrating an example of vehicle control according to the first mode.
Figure 18:
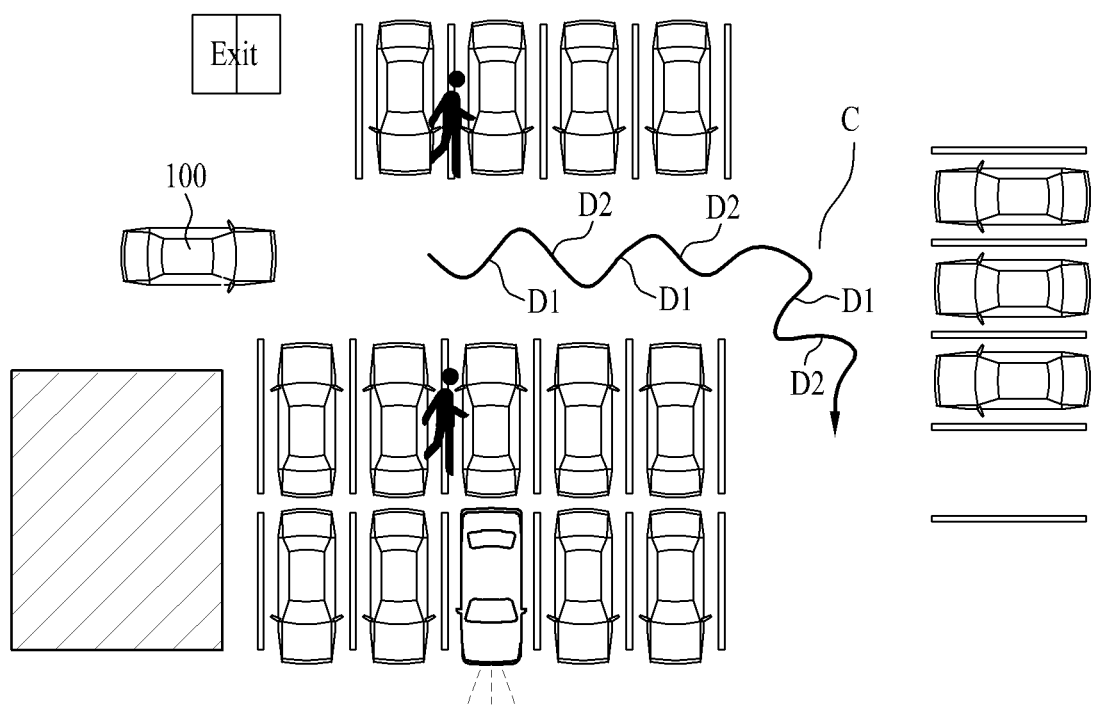
FIG. 18 is a schematic diagram illustrating an example of vehicle control according to the second mode.

The autonomous driving in the step S20 can be initiated in a parking facility including a plurality of parking spaces shown in FIGS. 11 and 18. The vehicle 100 can be manually driven by the user out of the parking facility. In this case, the control method of the present disclosure can be used only for the purpose of autonomous parking. On the other hand, the vehicle 100 can start autonomous driving according to the steps S10 and S20 at the outside of the parking facility shown in FIGS. 11 and 18 and then maintain the autonomous driving after entering the parking facility. In this case, the parking facility may be a destination or parking lot located nearby the destination, and the control method of the present disclosure can be comprehensively considered to be for autonomous driving including autonomous parking as part thereof.

While the vehicle 100 is autonomously driven (S10 and S20), the vehicle 100 can configure a position or space for parking (hereinafter referred to as a target parking position or space) [S30]. Although in the following description, the terms such as "parking position" and "parking space" are used to indicate a physical and geographical location for parking, there is no meaningful difference. In addition, the target parking position can be set at any time before the vehicle is parked irrespective of whether autonomous driving starts. That is, the target parking position can be set when autonomous driving starts or before autonomous driving is performed.

For example, in the configuration step 30, the vehicle 100 may be instructed to perform parking [S31] as shown in FIG. 9. That is, the vehicle 100 may receive a parking instruction from outside. As described above, parking may be instructed at any time before the vehicle is parked regardless of whether the vehicle 100 is autonomously driven. The parking instruction may be given while the vehicle 100 is autonomously driven or it may be given when autonomous driving starts or before the autonomous driving is performed. For example, regardless of whether the vehicle 100 is autonomously driven, the user may instruct the vehicle 100 to perform parking at the parking facility shown in FIGS. 11 and 18, e.g., at the destination or a nearby place.

In some examples, the user may instruct the vehicle 100 to perform parking at the outside of the parking facility, for example, at a place far away from the destination, and such a parking instruction may be simultaneously given to the vehicle together with the autonomous driving destination. Specifically, the user can instruct the vehicle 100 to perform parking using the user interface device 200. For example, when the user is in the vehicle 100, the user may use the interface device 200 in the vehicle 100 to instruct to perform parking. When the user is outside the vehicle 100, the user may use a mobile terminal working as the interface device 200. The configuration and operation of the user interface device 200 described above in FIGS. 1 to 7 can be applied with no additional description.

The interface device 200 can be used not only in a next designation step S32 but also in a mode control where user's manipulation is required. In some implementations, in the instruction step S31, the vehicle 100, that is, the control unit 170 can determine whether to perform parking and then start parking based on its decision instead of following the instruction from the user. More specifically, the vehicle 100 can perform the above-described detailed operations of the instruction step S31 by considering the surrounding environment and predetermined conditions. For example, when it is determined that the vehicle arrives at the parking facility or a nearby place, the vehicle 100 may determine and start parking. This control may be performed when the vehicle arrives at a parking facility/space adjacent to the predetermined destination or when the parking facility/space is set to the destination.

In addition to the parking instruction S31, the user can directly designate a specific parking space as the target parking position [S32]. In the designation step S32, the specific parking space may be an instantaneously available parking position or space, and thus it can be directly selected by the user. In detail, the specific parking space may be a dedicated parking space where only the user is allowed to park. Since other vehicles cannot use the dedicated parking space, it is always available, and thus it can be directly designated as the target parking position. In addition, the user can check an empty parking space with user's eyes and then designate the empty parking space as the target parking position. Owning to the solid availability, the above-described target parking positions (e.g., designated parking spaces) can be designated as destinations of autonomous driving.

In some implementations, similar to the instruction step S31, the vehicle 100 (e.g., the control unit 170) can directly designate a specific parking position as the target parking position instead of the user in the designation step S32. For example, when the vehicle 100 determines to perform parking by detecting entry into a parking facility in the step S31, the vehicle 100 can directly designate as the target parking position a dedicated parking space in the corresponding parking facility based on information on the dedicated parking space stored in the memory 140.

If a parking position is not designated, the vehicle 100 can search for an available parking space [S33]. In detail, the search step S33 may be performed when a parking space cannot be designated by the user or vehicle 100, for example, when there is no dedicated parking space or when empty spaces are not checked. In addition, even when a parking space can be designated, the parking space search may be instructed and performed to discover a better parking space. Similar to the designation step S32, in the search step S33, an instantaneously available parking space can be detected and then designated as the target parking position.

Through the designation and search steps S32 and S33, an available parking space can be designated or detected, the designated or detected parking position can be set to the target parking position.

Referring to FIG. 8 again, when the target parking position is set in the configuration step S30, the vehicle 100 can be autonomously driven according to a prescribed first mode as shown in "A" of FIGS. 8 and 9 [S100]. In other words, the control unit 170 can control the vehicle 100 to be autonomously driven based on the first mode. For example, as illustrated in FIG. 9, when there is an instantaneously available parking space, i.e., when a parking space is directly designated or when another available parking space is detected, the vehicle 100 can be autonomously driven according to the first mode. On the other hand, when the target parking position is not set in the configuration step S30, the vehicle 100 can be autonomously driven according to a prescribed second mode as shown in "B" of FIGS. 8 and 9 [S200].

For example, the control unit 170 can control the vehicle 100 to be autonomously driven based on the second mode. For example, as illustrated in FIG. 9, when there is no instantaneously available parking space, i.e., when a parking space is not directly designated or when a different available parking space is not detected, the vehicle 100 can be autonomously driven according to the second mode to discover an available parking space. In addition, even when there is no directly designated parking space and an available parking position is not detected at the same time, autonomous driving in accordance with the second mode can be performed. In summary, depending on whether the target parking position is set, the vehicle 100 can be controlled to be autonomously driven according to either the first mode or second mode.

When the target parking position is set, the vehicle may be controlled to be efficiently driven to the set target parking position. For such efficient driving, the vehicle 100 needs to arrive at the set target parking position along the set optimal path as soon as possible. Thus, the main purpose of the first mode of the above-described modes is to control the vehicle 100 when it has the set target parking position, and the first mode may be configured to control a speed of the vehicle 100 to move the vehicle to the set target parking position. In some examples, since the speed control of the vehicle 100 is accompanied with acceleration control, the first mode could be interpreted as controlling an acceleration of the vehicle 100. Hereinafter, autonomous driving according to the first mode S100 will be described in detail with reference to relevant drawings.

Figure 10:
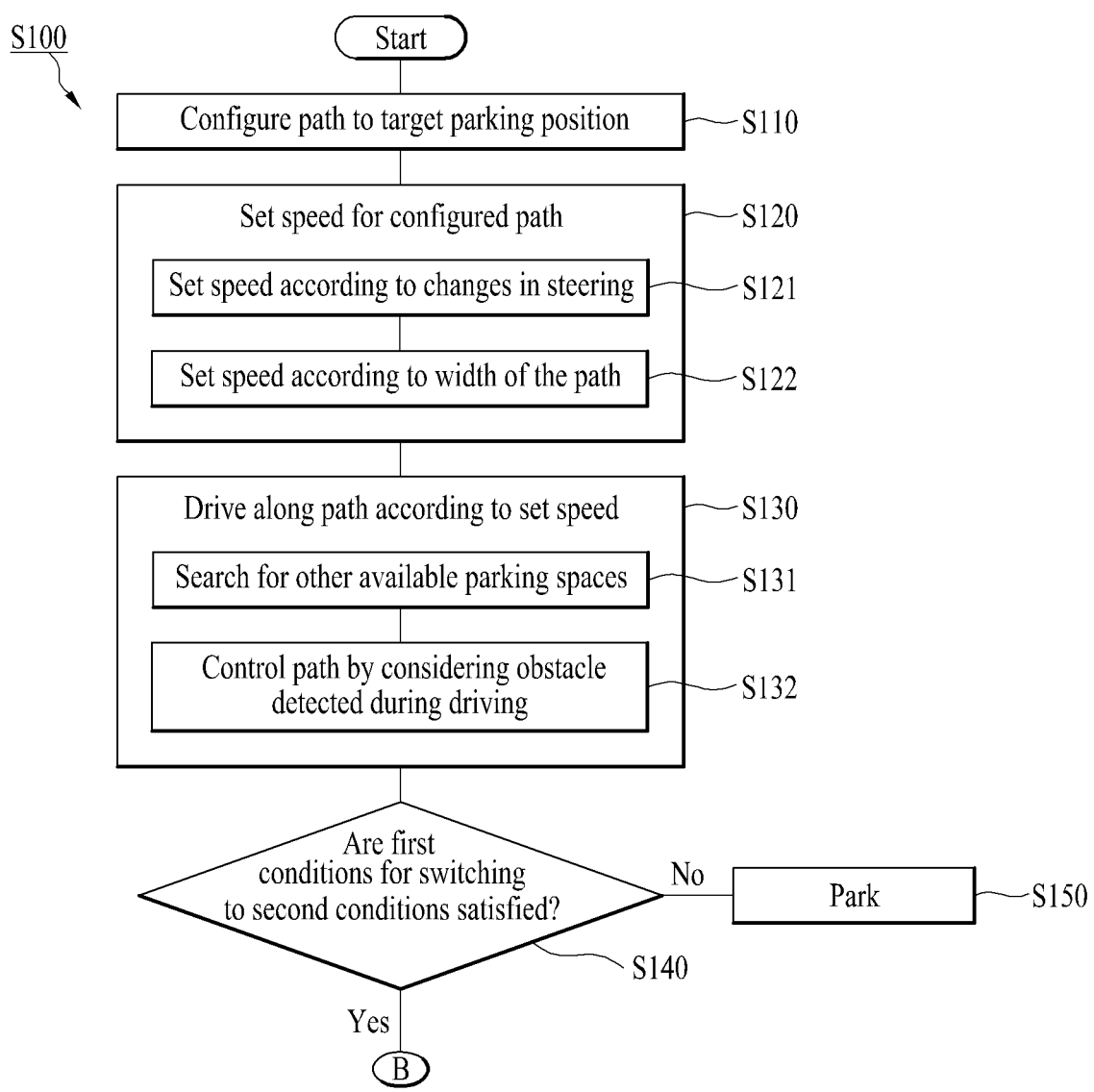
FIG. 10 is a flowchart illustrating an example vehicle control method according to an example first mode of FIG. 8.

FIG. 10 is a flowchart illustrating in detail an example vehicle control according to the first mode of FIG. 8, and FIG. 11 illustrates an example of vehicle control according to the first mode.

In some implementations, when the target parking position is set, the vehicle 100 may be located adjacent to the set target parking position. For example, referring to FIG. 11, at the time when a target parking position S1 is set, the vehicle 100 may be located close to the set target parking position S1 rather than away from the position S1 as shown in dotted lines. Considering that the main purpose of the first mode is to move the vehicle 100 to the target parking position S1, when the moving distance to the target parking position S1 is almost zero as shown in the example of FIG. 11, it may not be necessary to perform the first mode.

As shown in FIG. 8, when it is detected or determined that the vehicle 100 is located adjacent to the target parking position S1 [S40], the vehicle 100 can be directly parked at the target parking position S1 without driving in accordance with the first mode. In detail, a parking path to the target parking position S1 can be first set [S50], and then the vehicle 100 can be parked at the target parking position S1 along the set parking path [S60]. In this case, the parking path may mean a shot path for locating the vehicle 100 at the target parking position S1 different from the common autonomous driving path and include a change in orientation of the vehicle 100 towards the target parking position S1, an alignment of the vehicle with respect to the target parking position S1, etc. On the other hand, when it is detected or determined that the vehicle 100 is located far away from the target parking position S1 [S40], the vehicle 100 can be autonomously driven according to the first mode as shown in FIG. 10.

In the case of the autonomous driving in accordance with the first mode S100, a path to a destination can be first configured [S110]. To optimize the path, a shortest path may be configured without threatening safety of the vehicle 100. If there are a plurality of available parking positions or spaces, the plurality of available parking spaces are prioritized in the configuration step S30, and the highest priority of a parking space may be set to the target parking position. Here, although the priority may be given by various standards, it is desirable that the priority is given based on distance among the current location of the vehicle 100 and available parking spaces to minimize unnecessary movement of the vehicle 100.

For example, the highest priority may be given to the parking space closest to the vehicle 100, and then the parking space may be set to the target parking position. As described above, the path to the set target parking position can be configured in the configuration step S110. For example, when there are two available parking spaces S1 and S2 as shown in FIG. 11, the space close to the vehicle 100 can be selected as the target parking position, and then an optimal path to the space S1 can also be configured. In addition, as shown in the drawing, it may be detected that an obstacle or object, for example, a different vehicle 100A is located nearby the set space S1, a path P for not only avoiding a collision with the obstacle 100A but also minimizing the distance to the space S1 can be set to the optimal path.

Figure 12:
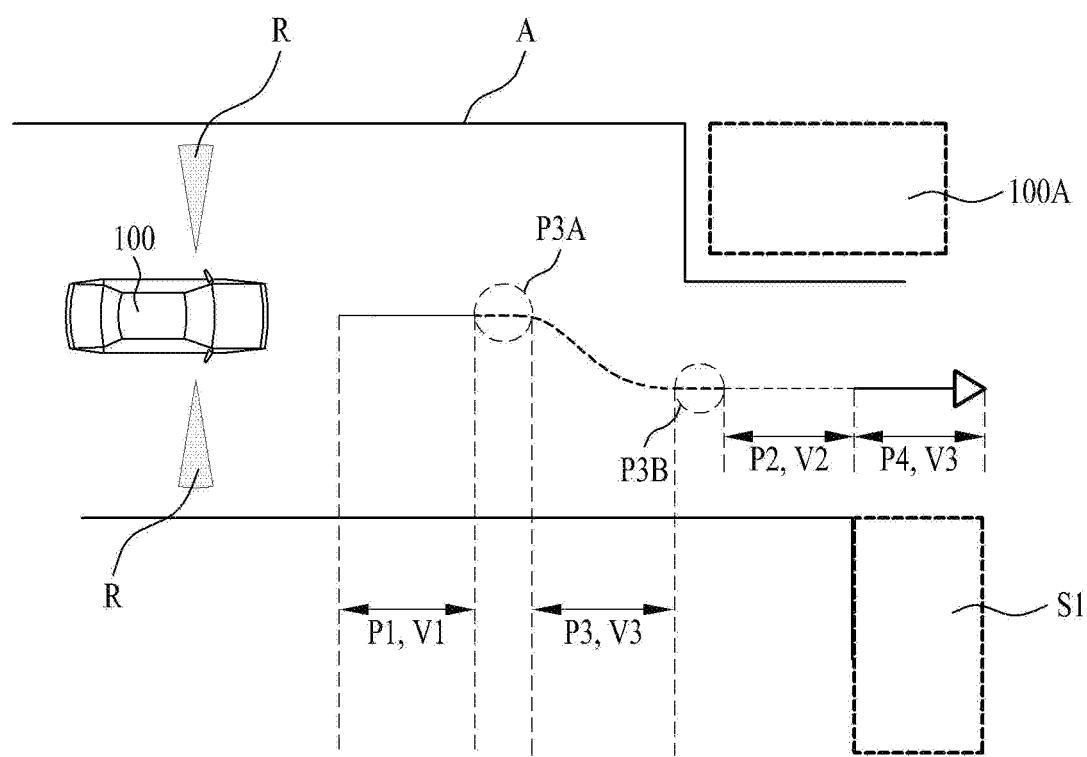
FIG. 12 is a schematic diagram illustrating an example of vehicle speed control according to the first mode.

After the path is configured in the configuration step S110, a speed of the vehicle 100 for the configured path can be configured [S120]. In the configuration step S120, the speed may be adjusted to allow the vehicle 100 to arrive at the target parking position as soon as possible while the vehicle 100 is driven along the path as described above. In detail, for safe and rapid arrival, different speeds may be given based on characteristics of sections of the configured path, and then acceleration of the vehicle 100 may be controlled according to the speeds. FIG. 12 is a schematic diagram illustrating an example of vehicle speed control according to the first mode. Hereinafter, the configuration step S120 will be described in detail with reference to FIGS. 11 and 12.

FIG. 12 shows in detail an area A including the configured path P in the example of FIG. 11. Referring to FIG. 12, the width of the path P may be relatively decreased due to the different vehicle 100A corresponding to the obstacle. The width of the path P may be changed by the environment of the parking facility, for example, the parking facility structure (e.g., pillar, arrangement of parking spaces, etc.) rather than obstacles. In detail, the parking facility may have a lane that allows vehicles to pass in one direction, and the path P may overlap with the lane. Thus, the path P may correspond to the above-described lane or a certain continuous space that allows the vehicle 100 to pass similar to the lane. Similarly, the width of the path P may correspond to that of the lane or space that allows the vehicle 100 to pass. Therefore, due to such a change in the above-described path P (e.g., lane or space), the path P may be configured such that a change in steering is required. Moreover, the path P may accompany a change in steering due to other various factors, for example, a geometrical or geographical contour such as arrangement of parking spaces.

In some examples, the vehicle can pass through sections of the path P where there is no steering change, e.g., straight-line sections P1 and P2 at a high speed in a stable manner, whereas, for stable driving, the vehicle 100 needs to reduce its speed in a section P3 where the steering change is required. In the steering change section P3, the steering of the vehicle 100 may be changed at least one time. In detail, in the section P3, the steering of the vehicle 100 is continuously changed, and thus the vehicle 100 can pass a curved path. On the other hand, in the section P3, the steering of the vehicle 100 is changed so as to change the orientation of the vehicle 100, and then it may not be significantly changed to maintain the changed orientation.

The section P3 may include all non-straight-line sections except a straight-line section, for example, a path parallel to the lane. For this reason, in the configuration step S120, the speed of the vehicle 100 may be adjusted according to the steering change for stable driving [S121]. That is, the vehicle 100 may change its speed according to steering changes, which occurs while the vehicle 100 passes along the configured path P to the target parking position S1. In detail, a speed V3 in the section P3 where the steering of the vehicle 100 is changed may be set lower than speeds V1 and V2 in the sections P1 and P2 where there is no steering change. In other words, the speed V3 in the non-straight-line section P3 may be set lower than the speeds V1 and V2 in the straight-line sections P1 and P2 (V1 and V2>V3).

In addition, in the section P1 where the width of the path P, i.e., the width of the detected lane or space is wide, the vehicle 100 can be stably driven at a high speed. On the other hand, in the section P2 where the width of the path P is relatively narrow, the vehicle 100 needs to reduce its speed to prevent departure from the path P. Thus, in the configuration step S120, the speed of the vehicle 100 can be adjusted according to the width of the path P, and more specifically, changes in the width [S122]. That is, the vehicle 100 may change its speed according to changes in the width of the path P, which occurs while the vehicle 100 passes along the configured path P to the target parking position S1. In detail, the speed V1 in the section P1 where the width of the path P, i.e., the width of the detected lane or space is wide may be higher than the speed V2 in the section P2 where the width of the path P is relatively narrow (V1>V2).

In some examples, a sensor with a detection range R of the object detection device 300 can be used to determine the relative width of the path P. For example, to detect objects at both sides of the vehicle 100, the detection range R may be extended in lateral or width directions of the vehicle 100 (see FIG. 1), and more specifically, in directions perpendicular to the centerline of the vehicle 100 as illustrated in the drawing. Since the vehicle 100 generally passes along the path P, e.g., lane, the detection range R extended in the width directions may be efficient in estimating the width of the path P or lane. In detail, if it is detected or determined that the width of the path P, lane or space is greater than the detection range of the sensor, the vehicle 100 may determine that the width of the path P is wide. For example, if structures that limit the path P such as a wall, parking space, etc. are not simultaneously detected at both sides of the vehicle 100 while the vehicle 100 passes along the path P, i.e., the center of the lane, the vehicle 100 may determine that the width of the path P, lane or space is equal to or smaller than the detection range and thus the width of the path P is narrow.

Further, the width of the vehicle 100 may be used to determine the relative width of the path P. In detail, if it is detected or determined that the width of the path P, lane, or space is greater than that of the vehicle 100, the vehicle 100 may determine that the width of the path P is wide. Otherwise, the vehicle 100 may determine that the width of the path P is narrow. For example, when the width of the path P is about double of that of the vehicle 100, it may be determined that the path P has a wide width.

According to the above-described vehicle configurations, the vehicle 100 can be driven as follows. First, the vehicle 100 may pass through the first section P1, where there is no steering change, at the first speed V1. In addition, the vehicle 100 may pass through the second section P2, where the path P has a relatively narrow width and where there is no steering change, at the second speed V2. In this case, the second speed V2 may be set lower than the first speed V1. Moreover, the vehicle 100 may pass through the third section P3, where the steering is changed, at the third speed V3, and the third speed V3 may be set lower than the first and second speeds V1 and V2. Furthermore, if the vehicle 100 changes its steering and at the same time, reduces its speed, the driving of the vehicle 100 may become unstable. Thus, a prescribed section P3A immediately before the third section P3 may be set as a straight-line section.

In some implementations, the vehicle 100 may be configured to pass through the section P3A at the third speed V3. Further, since the vehicle 100 requires time for acceleration, the vehicle 100 may be configured to pass through a prescribed section P3B immediately after the third section P3 at a speed higher than the third speed V3 but lower than the second speed V2 or first speed V1. Additionally, when the vehicle 100 approaches the target parking position S1, the vehicle 100 needs to prepare for parking. For example, for accurate and safe parking, the vehicle 100 should detect not only information on the target parking position S1 but also information on the surrounding environment and then configure the parking path based on the detected information.

If the vehicle 100 moves around the target parking position S1 at a high speed, the vehicle 100 may have difficulties in preparing for parking, for example, in detecting the information and configuring the path. Therefore, regardless of a change in the steering, the speed of the vehicle 100 in the fourth section P4 adjacent to the target parking position S1 may be set lower than the first and second speeds V1 and V2 in the first and second sections P1 and P2 each of which correspond to a straight-line section. In detail, the fourth section P4 may correspond to a section from a point where the target parking position S1 is included in the detection range of the vehicle 100 to the target parking position S1. Further, a speed in the fourth section P4 may be equal to, for example, the third speed V3 in the third section P3 where the steering is changed. Alternatively, the speed in the fourth section P4 may be set lower than the third speed V3.

Based on the speeds determined in the speed setting step S120, the vehicle 100 can be driven along the configured path according to the first mode [S130]. In addition to the speeds set in the step S120, additional control is applied to the vehicle 100 for more efficient driving to the target parking position S1 during the driving step S130.

First, while the vehicle is driven to the target parking position S1, other available parking spaces can be searched for [S131]. In the searching step S131, the object detection device 300 may be used to search for and detect available parking spaces. In addition, to prevent unnecessary power consumption and excessive operation of the control unit 170, some sensors in the detection device 300, which have a detection direction or range oriented towards the parking spaces, can be used only. For example, when the parking spaces are located at sides of the driving vehicle 100, sensors disposed on the sides of the vehicle 100 may be operated.

When the parking spaces are located at the front or back of the vehicle 100, sensors disposed on the front or back of the vehicle 100 may be used. To increase a probability of detecting the available parking spaces, the searching step S131 can be continuously performed until the vehicle 100 arrives at the target parking position S1. Through the searching step S131, information of the detected available parking spaces can be stored in the memory 140 of the vehicle 100. Thereafter, if the set target parking position becomes unavailable due to several reasons (this will be described later), one of the detected available parking spaces may be set to a new target parking position according to the predetermined priority as described above in the target parking position configuration step S30 and path configuration step S110.

If there are other available parking spaces when the target parking position is initially configured in the step S30, such additional spaces may be considered together with the parking spaces detected in the step S131 in configuring the new target parking position, and thus the optimal new target parking position can be configured. Thereafter, the vehicle 100 can start autonomous driving according to the first mode again by performing the steps S110 to S130 without entering the second mode for searching for a parking space, which will be described later. That is, in the searching step S131, the vehicle 100 can simultaneously detect parking spaces while being driven in first mode, and thus reconfigure the optimal target parking position without entering the second mode and restart the first mode. Hence, through the searching step S131, the vehicle 100 can perform parking rapidly and efficiently.

In addition, for the same reason as the searching step S131, during the driving step S130, sensors in the object detection device 300 for detecting an event that threatening safety (e.g., various obstacles and parking facility structures) can be operated only. For example, only the sensors disposed on the front/back and sides of the vehicle 100 can be operated during the driving step S130, and thus it is possible to prevent unnecessary power consumption and excessive operation of the control unit 170. For the same reason, other environment information except available parking spaces may not be stored in the memory 140 during the driving step S130.

In some implementations, if the vehicle 100 detects that there is an object on the configured path P while being driven in the first mode, safety driving may not be guaranteed due to collision probability between the vehicle 100 and object. As described above, when the autonomous driving according to the first mode starts, the path P to the target parking position is at least configured based on the environment included in the sensor's detection range. Thus, the detected object may be an object newly appearing on the configured path P. However, a new object, which does not move, may be detected in the path due to other changes in the environment. Therefore, during the driving step S130, the driving of the vehicle 100 may be controlled by considering the detected object, e.g., obstacle.

In some examples, the driving may be controlled based on the steering of the vehicle 100, for instance, characteristics of the object detected on the path. However, the speed control configuration or scheme according to the path characteristics described above in the speed setting step S130 may be equally applied to the path adjusted according to the object characteristics. That is, when the initially configured path (e.g., the path configured in the configuration step S110) is adjusted according to the characteristics of the newly emerged object in the control step S132, a speed allocated to each section of the path may be newly configured based on the changed characteristics of the adjusted path in the configuration step S130.

Figure 13A:
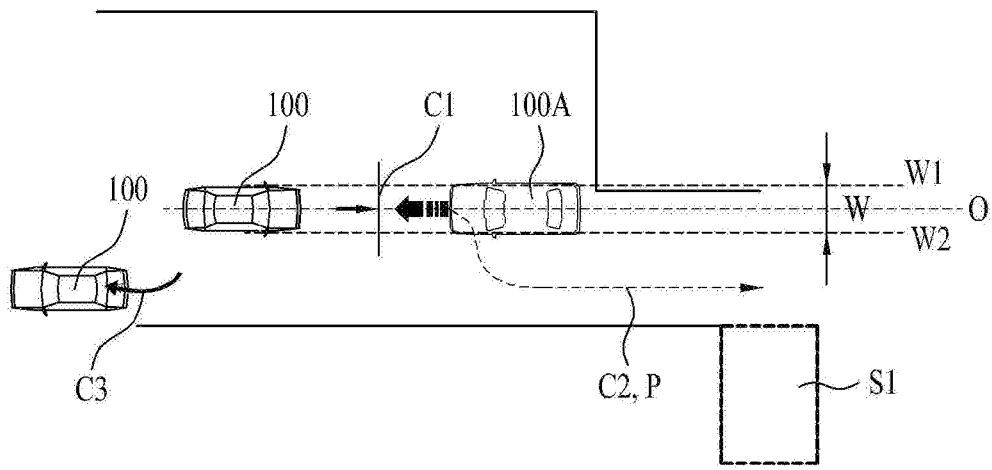
FIGS. 13A and 13B are schematic diagrams illustrating examples of vehicle path control according to the first mode when an example object approaches an example vehicle from a front of the vehicle.
Figure 13B:
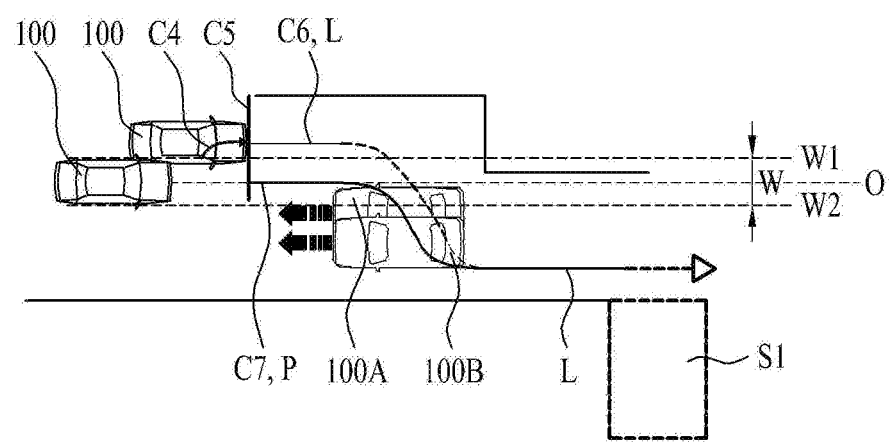
Figure 14A:
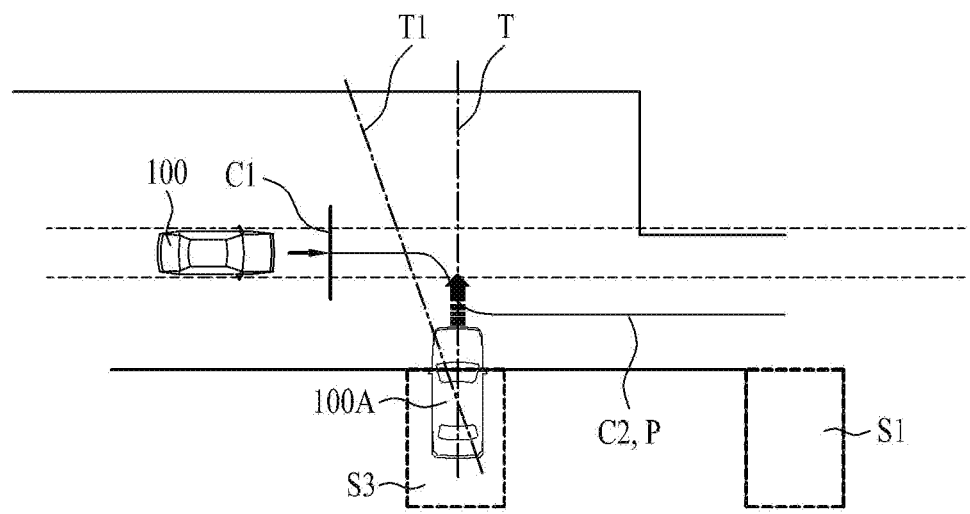
FIGS. 14A and 14B are schematic diagrams illustrating examples of vehicle path control according to the first mode when an object approaches an example vehicle from a side of the vehicle.
Figure 14B:
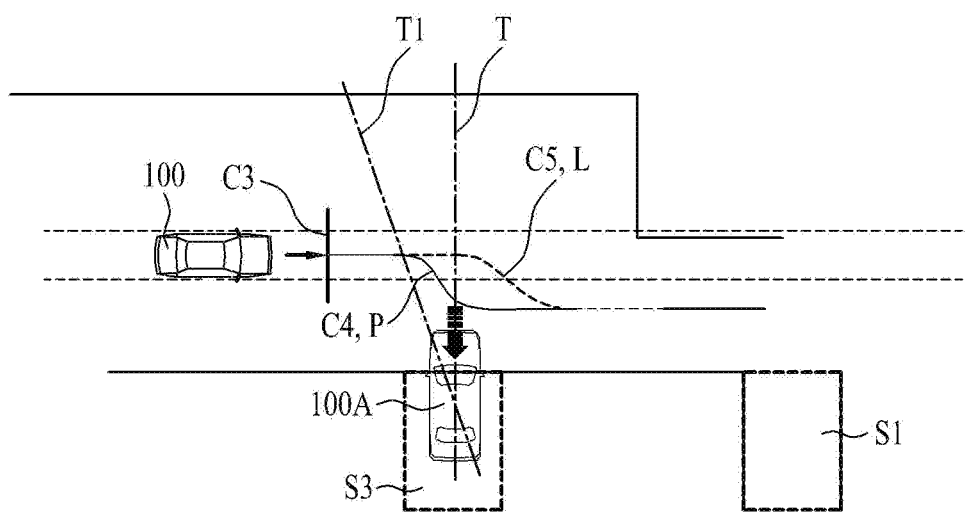
Figure 15A:
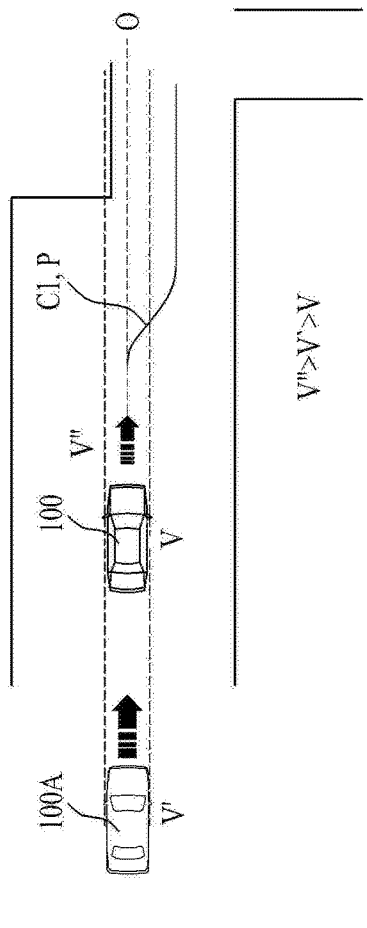
FIGS. 15A and 15B are schematic diagrams illustrating examples of vehicle path control according to the first mode when an object approaches an example vehicle from a back of the vehicle.
Figure 15B:
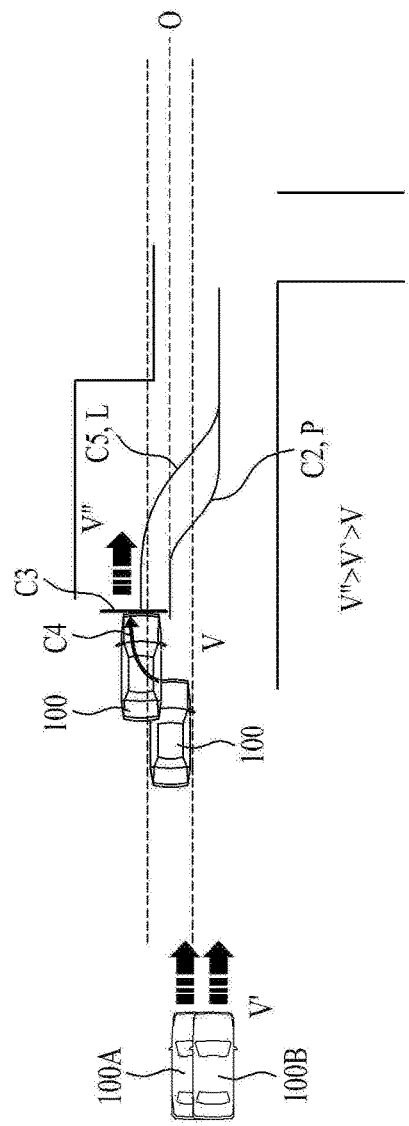

Hereinafter, with reference to the relevant drawings, the path control step S132 will be described in detail regarding characteristics of objects. FIGS. 13A and 13B illustrate examples of vehicle path control according to the first mode when an object approaches a vehicle from the front of the vehicle. FIGS. 14A and 14B illustrate examples of vehicle path control according to the first mode when an object approaches a vehicle from the side of the vehicle. FIGS. 15A and 15B illustrate examples of vehicle path control according to the first mode when an object approaches a vehicle from the back of the vehicle. As illustrated in these drawings, the path control will be described based on movement characteristics among various characteristics of an object. In addition, although these drawings show vehicles as examples of moving objects, the vehicles can be replaced with all types of moving objects including people and other types of transportation.

Referring to FIGS. 13A and 13B, while the vehicle 100 is autonomously driven along the configured path according to the first mode, the vehicle 100 may detect an object (e.g., the different vehicle 100A) that approaches the vehicle 100 from the front of the vehicle 100. That is, the different vehicle 100A is driven in a direction opposite to that of the vehicle 100, and thus it may become closer to the vehicle 100. In this case, to determine risk of the different vehicle 100A and control the path based on the risk, the vehicle 100 may determine whether it is on the same line with the different vehicle 100A.

For example, the vehicle 100 may determine whether the different vehicle 100A is present in its driving direction or on a line extended along the driving direction. If the different vehicle 100A and vehicle 100 are on the same line and the vehicles maintain their current paths, they are highly likely to collide with each other. Therefore, the current path or steering of the vehicle 100 should be adjusted. The centerline O of the vehicle 100, more accurately, the centerline O in the length direction of the vehicle 100 may represent the driving direction of the vehicle. Thus, to control the path of the vehicle 100, whether the vehicles 100 and 100A are present on the same line and the risk of the different vehicle 100A, i.e., the collision probability can be determined using the centerline O. More specifically, whether the vehicles 100 and 100A are on the same line and the risk caused thereby can be determined based on whether the centerline O passes through the different vehicle 100A.

Thus, when the centerline O passes through the different vehicle 100A as show in FIG. 13A, it can be determined that the collision probability between the different vehicle 100A and vehicle 100 is significantly high and they are actually on the same line. In this case, referring to FIG. 13A, the vehicle 100 can immediately stop to minimize the collision probability [C1]. For the same reason, the vehicle 100 may not change its steering until it stops. Thereafter, when the different vehicle 100A passes by the vehicle 100 without any collisions, for example, when the different vehicle 100A is out of the detection range of the vehicle 100 and thus is not detected any more, the vehicle 100 may be driven along the pre-configured path P or configure a new path to the target parking position and start driving [C2].

In some examples, after the vehicle 100 stops, the vehicle 100 may detect that the different vehicle 100A does not move any more after the vehicle 100 stops [C1]. Although there are many reasons, the different vehicle 100A may stop because there is no space enough to pass. In addition, when the different vehicle 100A stops after the vehicle 100 stops

[C1], the vehicle 100 may move out of the current lane or space [C3], and thus the space required for the different vehicle 100A to pass can be provided. In addition, even though the different vehicle 100A does not stop, the vehicle 100 may move out of the current lane or space before or after the stop [C1].

For example, the vehicle 100 may move to one side of the current lane and then stop, and vice versa. Preferably, the vehicle 100 may move away from the different vehicle 100A. That is, avoidance driving C3 can be performed at any time regardless of before or after the stop, irrespective of changes in movement characteristics of the different vehicle 100A, for example, movement/stop and steering change. In summary, the vehicle 100 may be configured to enable the different vehicle 100A to pass by the corresponding vehicle 100 in any cases.

Since one of the purposes of the above-described stop C1 and driving restart C2 is to guarantee the safety of the vehicle 100, the stop C1 and driving restart C2 can be considered as control for the autonomous driving in accordance with the first mode. In some examples, the stop C1 and driving restart C2 can be applied to all objects, which can be detected during driving according to the first and second mode, including the examples shown in FIGS. 13A to 15B.

In some examples, since the main purpose of the avoidance driving C3 is to enhance the safety of the vehicle 100, the avoidance driving C3 can be selectively performed before or after the stop C1, depending on the movement characteristics of the different vehicle 100A that approaches the vehicle 100. Similarly, the avoidance driving C3 can be applied to all objects, which can be detected during driving according to the first and second mode, including the examples shown in FIGS. 13A to 15B. For the same reason, the steering of the vehicle 100 may not be changed before and after the stop C1, and it can be applied to all objects that can be detected during driving according to the first and second mode.

In some implementations, as shown in FIG. 13B, when the centerline O does not pass through the different vehicle 100A, it can be determined that the different vehicle 100A and vehicle 100 are not on the same line, and the collision probability therebetween is low. In this case, for driving control of the vehicle 100, whether the paths of the vehicles 100 and 100A overlap with each other may be further determined using a width W of the vehicle 100. By doing so, the actual collision probability may be additionally determined. Since the width of the vehicle 100 can provide determination range wider than that provided by the centerline O and define an actual collision range with the approaching vehicle 100A, whether the collision occurs can be determined more accurately by using the width W. In detail, the overlap between the paths of the vehicles 100 and 100A and the collision probability can be finally determined based on whether the width W of the vehicle 100 overlaps with a width of the different vehicle 100A. That is, referring to FIG. 13B, whether at least part of the different vehicle 100A is included between lines W1 and W2 (i.e., in the width W), which are extended at both sides of the vehicle 100 and configured parallel to the centerline O may be considered to determine the overlap between the paths.

For this reason, as shown in FIG. 13B, when the centerline o does not pass through the different vehicle 100A but the width of the different vehicle 100A overlaps with that of the vehicle 100, it can be determined that their paths overlap with each other and thus the collision probability still exists. In this case, the vehicle 100 may stop to minimize the collision probability [C5] as shown in FIG. 13B. Since the collision probability in the example of FIG. 13B is relatively lower than that in the example of FIG. 13A, the vehicle 100 can change its steering [C4] until it stops [C5] to enhance its safety. In detail, the vehicle 100 may adjust the steering until it stops [C5] so that the vehicle 100 is away from the different vehicle 100A, which approaches the vehicle 100. By doing so, the path of the vehicle 100 may not overlap with that of the different vehicle 100A.

When the different vehicle 100A passes by the vehicle 100 without any collisions after the vehicle 100 stops [C5], for example, when the different vehicle 100A is out of the detection range of the vehicle 100 and thus is not detected any more, the vehicle 100 may be located out of the pre-configured path P due to avoidance steering [C4]. Thus, the vehicle 100 may configure a new path L to the target parking position S1 and then starts driving. On the other hand, when the centerline O does not pass through a different vehicle 100B and the width of the vehicle 100 does not overlap with that of the different vehicle 100B, it can be determined that the paths of the vehicles 100 and 100B do not overlap with each other and thus, there is no collision probability. In this case, the vehicle 100 may move along the pre-configured path P [C7].

However, while moving along the path P [C7], the vehicle 100 may reduce its speed below the predetermined speeds (i.e., V1 to V3) in some sections of the path P, which are close to an expected movement path of the different vehicle 100B, i.e., in at least one of the sections P1 to P4 for the purpose of the safety. In addition, when it is determined that the centerline O does not pass through the different vehicle 100B and the width of the different vehicle 100A does not overlap with that of the vehicle 100, the vehicle 100 may stop and then restarts driving [C7] after the different vehicle 100B passes by as described in FIG. 13A. Moreover, for more safety driving, the avoidance steering may be performed before or after the stop so that the vehicle 100 can be away from the different vehicle 100A.

Referring to FIGS. 14A and 14B, while the vehicle 100 is autonomously driven along the configured path according to the first mode, the vehicle 100 may detect an object (e.g., the different vehicle 100A) that approaches the vehicle 100 from the side of the vehicle 100. In detail, a driving path or direction T or T1 of the different vehicle 100A is crossed with that of the vehicle [100] at the front of the vehicle 100. In other words, the different vehicle 100A may have the driving direction T, which is perpendicularly crossed with the driving direction of the vehicle 100, or the driving direction T1, which is not perpendicularly crossed with the driving direction of the vehicle 100. In this case, to determine risk of the different vehicle 100A and control the path based on the risk, the vehicle 100 may determine whether the different vehicle 100A with the aforementioned driving direction T or T1 approaches or moves away from the side the vehicle 100. If the different vehicle 100A approaches the vehicle 100 and each vehicle maintains its current path, a collision probability therebetween may be significantly increased.

For this reason, when the different vehicle 100A approaches the vehicle 100 from the side of the vehicle 100 as shown in FIG. 14A, it can be determined that the collision probability between the different vehicle 100A and vehicle 100 is high. For example, the different vehicle 100A may move out of a parking space S3 close to the vehicle 100. In this case, referring to FIG. 14A, the vehicle 100 can immediately stop to minimize the collision probability [C1]. For the same reason, the vehicle 100 may not change the steering until it stops [C1].

In some implementations, the vehicle 100 may move away from the different vehicle 100A before or after the stop [C1]. Thereafter, when the different vehicle 100A passes by the vehicle 100 without any collisions, for example, when the different vehicle 100A is out of the detection range of the vehicle 100 and thus is not detected any more, the vehicle 100 may be driven along the pre-configured path P or configure a new path to the target parking position and start driving [C2]. If the vehicle 100 determines that the different vehicle 100A moves away from the vehicle 100 after approaching, for example, the different vehicle 100A enters the parking space S3 again, the vehicle 100 may perform the driving C2.

In some examples, as shown in FIG. 14B, when the different vehicle 100A moves away from the vehicle 100 from the side of the vehicle 100, it can be determined that the collision probability between the different vehicle 100A and vehicle 100 is low or zero. For example, the different vehicle 100A may enter the parking space S3 close to the vehicle 100. In this case, as shown in FIG. 14B, the vehicle 100 may stop to minimize the collision probability. Thereafter, if the vehicle 100 detects that the different vehicle 100A stops, for example, the different vehicle 100A is parked in the parking space S3, the vehicle 100 can move to the target parking position S1 along the pre-configured path P [C4].

In some examples, the vehicle 100 may configure the new path L to the target parking position S1 and then starts driving [C5]. The new path L may be configured such that the vehicle 100 detours or moves away from an expected movement path of the different vehicle 100A. For example, the new path L may be configured such that the vehicle 100 detours or moves away from the driving direction T or T1 of the different vehicle 100A, which is previously detected or expected. In addition, it is desirable that while performing driving C4 or C5, the vehicle 100 reduces its speed below the speeds V1 to V3, which can be configured in the step S120 according to the characteristics of the corresponding sections, in some sections of the paths P and L close to the expected movement path of the different vehicle 100A. Further, the vehicle 100 may perform the driving C4 or C5 before instead of after the different vehicle 100A stops.

Referring to FIGS. 15A and 15B, while being autonomously driven along the configured path according to the first mode, the vehicle 100 may detect an object (e.g., the different vehicle 100A) that approaches the vehicle 100 from the back of the vehicle 100. That is, the different vehicle 100A is driven along the same lane or space in the same direction as that of the vehicle 100, and thus it may become closer to the vehicle 100. In this case, to determine risk of the different vehicle 100A and control the path based on the risk, the vehicle 100 may compare its speed V with a speed V' of the different vehicle 100A.

When the speed V of the vehicle 100 is higher than the speed V' of the different vehicle 100A, the vehicle 100 may determine that the different vehicle 100A cannot follow the vehicle 100 and thus the collision probability is low. Thus, the vehicle 100 may continuously move along the pre-configured path P without any adjustment. On the other hand, when the speed V of the vehicle 100 is lower than the speed V' of the different vehicle 100A, the vehicle 100 may determine that the different vehicle 100A can follow the vehicle 100 and thus the collision probability is high. Therefore, in this case, the path and steering of the vehicle 100 should be controlled based on more detailed determinations.

For this reason, in addition to the above-described speed comparison, it can be determined whether the different vehicle 100A and vehicle 100 are on the same line, that is, whether the different vehicle 100A is in the driving direction of the vehicle 100. Such determination may be made by considering a relationship between the vehicle 100's centerline O and different vehicle 100A. Since details are the same as those described with reference to FIGS. 13A and 13B, it will not be described herein.

When the speed V of the vehicle 100 is lower than the speed V' of the different vehicle 100A and the centerline O of the vehicle 100 goes through the different vehicle 100A as shown in FIG. 15A, it can be determined that these vehicles are actually on the same line. In this case, if each vehicle maintains its current path, the collision probability may be significantly increased. However, in this case, it is commonly believed that the vehicle 100, which is ahead of the different vehicle 100A, has priority over the different vehicle 100A in terms of driving. Thus, as shown in FIG. 15A, the vehicle 100 can be continuously driven along the pre-configured path P [C1].

As shown in FIG. 15A, instead of being driven along the pre-configured path P, the vehicle 100 may first stop to allow the different vehicle 100A to pass by the vehicle 100 and then restart the driving along the path P as described in the example of FIG. 13A. Such control can enable the vehicle 100 to be driven more safely. In addition, the vehicle may move to one side of the lane or space to move away from the different vehicle 100A after or before the vehicle 100 stops. That is, the avoidance driving can be performed at any time regardless of before or after the stop, irrespective of changes in movement characteristics of the different vehicle 100A, for example, movement/stop and steering change. In summary, the vehicle 100 may be configured to enable the different vehicle 100A to smoothly pass by the corresponding vehicle 100 in any cases and restart the driving along the pre-configured path, thereby improving the driving safety of the vehicle 100.

In the example of FIG. 15B, when the centerline of the vehicle 100 does not pass through the different vehicle 100A although the speed V of the vehicle 100 is lower than the speed V' of the different vehicle 100A, it can be determined that the different vehicle 100A and vehicle 100 are not on the same line, and the collision probability therebetween is low. In this case, similar to the example of FIG. 15A, the vehicle 100 can be continuously driven along the pre-configured path P based on the priority given to the vehicle 100 [C2]. In addition, for the driving safety, the vehicle 100 may be accelerated up to a speed V''', which is higher than the speed V' of the different vehicle 100A. However, the new speed V''' cannot be increased in excess of the speed limit of the parking facility for the reason of safety. since this acceleration allows the vehicle 100 to keep a constant distance from the different vehicle 100A, the driving safety of the vehicle 100 can be improved. For the same reason, such acceleration can be applied to the driving C1 along the pre-configured path P described in FIG. 15A.

In some implementations, for safety, the vehicle 100 can stop [C3] to minimize the collision probability as shown in the example of FIG. 15B. In addition, until the vehicle 100 stops, the vehicle 100 may not change the steering or adjust the steering for the purpose of improving its safety [C4]. In detail, the vehicle 100 may adjust the steering so as to move away from the different vehicle 100A [C4] until it stops

[C3], and by doing so, the paths of the vehicle 100 and different vehicle 100A completely do not overlap with each other.

When the different vehicle 100A passes by the vehicle 100 without any collisions after the vehicle 100 stops [C3], for example, when the different vehicle 100A is out of the detection range of the vehicle 100 and thus is not detected any more, the vehicle 100 may be located out of the pre-configured path P due to the avoidance steering [C4]. Thus, the vehicle 100 may configure a new path L to the target parking position S1 and then starts driving. However, when the pre-configured path P is maintained because the steering is not changed before the stop [C3], the vehicle 100 may continuously move along the path P [C2]. The above-described path control C2 to C5 can be applied to both cases described in FIG. 15B, that is, it can be applied regardless of whether widths of the vehicle 100 and different vehicle 100A overlap with each other or not. Since determination of overlap therebetween is the same as that described in FIG. 13B, details will be omitted herein.

Figure 16A:
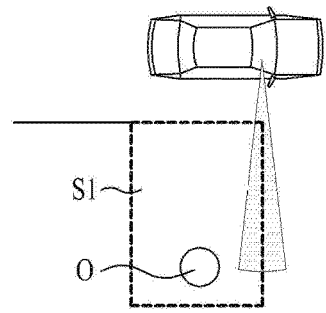
FIGS. 16A to 16C are schematic diagrams illustrating examples of first conditions for switching to an example second mode of FIG. 10.
Figure 16B:
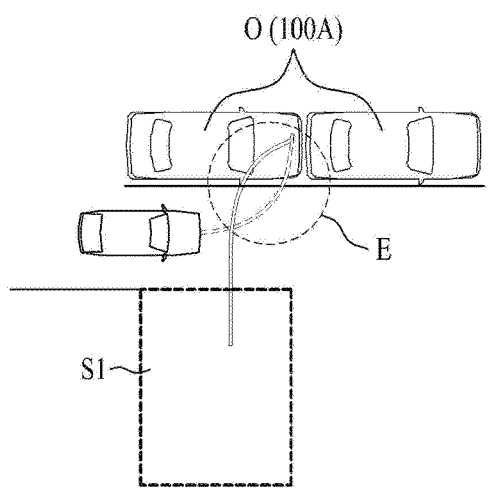
Figure 16C:
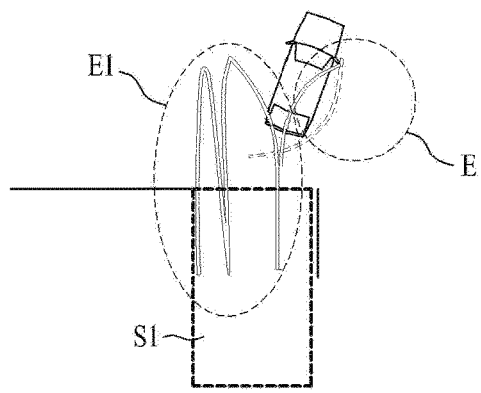

When the vehicle 100 arrives at the set target parking position S1 through the aforementioned driving step S130, the vehicle 100 can determine whether the target parking position S1 is still available [S140]. Regarding such determination, conditions that make the set target parking position S1 unavailable, that is, conditions for defining unavailability of the set target parking position S1 can be predetermined as first conditions. The first conditions can be stored in the memory 140 and used by the control unit 170 in determining unavailability of the target parking position S1. FIGS. 16A to 16C illustrate examples of first conditions for switching to the second mode of FIG. 10. Hereinafter, a description will be given of the determination step S140 with reference to FIGS. 10 and 16A to 16C.

First, when the vehicle 100 determines that the target parking position S1 is still available, that is, that the first conditions are satisfied after arriving at the parking position S1, the vehicle 100 may detect information on the target parking position S1, for example, information on the surrounding environment of the parking position S1 and then configure a parking path to the parking position based on the information. Thereafter, the vehicle can be parked along the parking path at the target parking position S1 [S150].

However, the vehicle 100 may determine that the target parking position S1 is unavailable, and in this case, the aforementioned examples of FIGS. 16A to 16C may be used as the first conditions for the determination. First, as shown in FIG. 16A, the vehicle 100 may detect that the set target parking position S1 is occupied by a different object O. Here, the different object O may be any object that occupies at least part of the target parking position S1 and prevents the vehicle 100 from being parked, including other vehicles or people.

In addition, as shown in FIG. 16B, the vehicle 100 may determine that a parking path E to the set target parking position S1 cannot be configured. For example, although the target parking position S1 is empty, the vehicle 100 may not configure the proper path E due to interference from the nearby obstacle O. Moreover, referring to FIG. 16C, although the vehicle configures the parking path E to the empty parking position S1, the vehicle 100 may determine that it fails to park using the parking path E within a predetermined time or a predetermined number of attempts.

For example, the vehicle 100 may detect and determine that after failure of an initial attempt to park along the configured parking path E due to characteristics of the parking position S1 such as shape or arrangement, the vehicle 100 still fails to park at the target parking position S1 using changed parking paths E1 within the predetermined time or the predetermined number of attempts after failure of an initial attempt to park along the configured parking path E due to characteristics of the parking position S1 such as shape or arrangement.

As described above, in addition to the set target parking position S1, the vehicle 100 can obtain other available parking spaces in advance through the configuration step S30 and searching step S131. If the set target parking position S1 is unavailable as described with reference to FIGS. 16A to 16C, the vehicle 100 may set one of the available parking spaces to a new target parking position and then be driven in the first mode through the steps S110 to S130. In addition, the vehicle 100 can repeat the above-described process until it finally arrives at an available parking space.

When it is determined in the above-described step S140 that all the pre-obtained parking spaces are unavailable, the vehicle 100 may determine that there is no additional space to be set to the target parking position and then should search for additional available parking spaces. Thus, in the vehicle control according to the first mode, the first conditions basically include unavailability of the set target parking position. Moreover, whether other parking spaces that can be set to the target parking position are obtained (that is, discovered or designated) can be considered additionally. In this case, when the pre-configured target parking position is unavailable as shown in the examples of FIGS. 16A to 16C and other available parking spaces are not secured, it can be determined that the first conditions are satisfied.

When it is determined that the first conditions are satisfied as described above, the vehicle can switch its autonomous driving mode from the first mode to the second mode [S200] as shown in "B" of FIGS. 8 and 10. In other words, if the first conditions are satisfied, the vehicle 100 can be autonomously driven according to the predetermined second mode.

If the first conditions are satisfied as described above, the vehicle 100 does not have any recognized or secured available parking spaces. In this case, a plurality of methods including searching can be used to secure available parking spaces for parking as intended. In addition, searching basically requires continuous movement of the vehicle 100, the path or steering of the vehicle 100 needs to be optimally controlled to improve a probability of discovering an available parking space. For this reason, unlike the first mode, the main purpose of the second mode is to control a vehicle with no target parking position, and it can be configured to control the path of the vehicle 100 to discover available parking spaces that can be set to the target parking position. According to the purposes and functions of the first and second modes, the first and second modes can include different driving speeds and steering controls. Hereinafter, autonomous driving according to the second mode S200 will be described with reference to relevant drawings.

Figure 17:
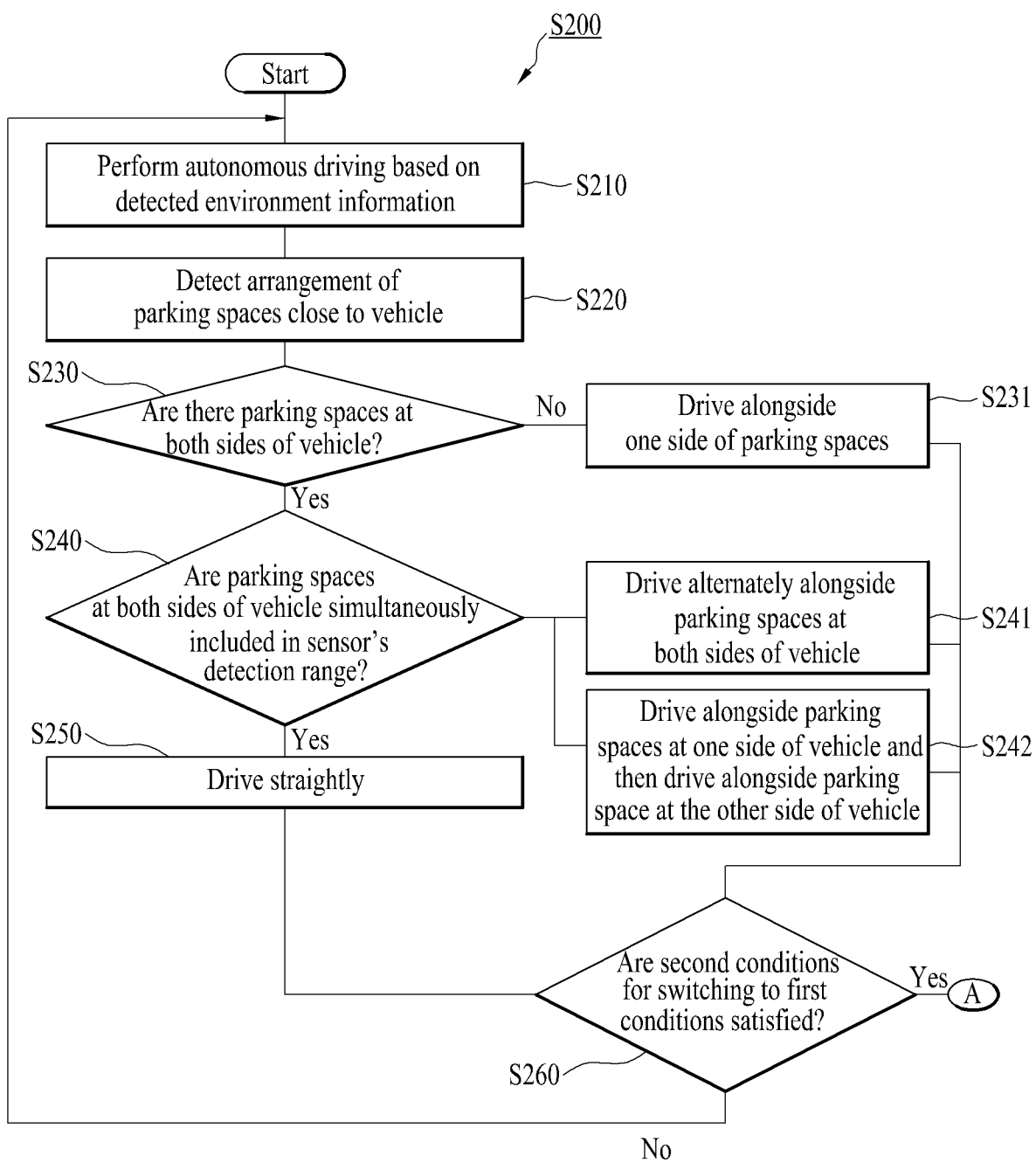
FIG. 17 is a flowchart illustrating an example vehicle control in detail according to the second mode of FIG. 8.

FIG. 17 is a flowchart illustrating in detail an example vehicle control according to the second mode of FIG. 8, and FIG. 18 illustrates an example of vehicle control according to the second mode.

In the case of the autonomous driving in accordance with the second mode S200, the vehicle 100 can be autonomously driven based on the detected environment information [S210]. Since the driving step S210 is actually identical to the above-described detection and driving steps S10 and S20, the detailed features of the steps S10 and S20 can be equally applied to the driving step S210. In some implementations, considering that the vehicle 100 has no target parking position in the driving step S210, it is not necessary to configure a destination and path thereto in advance.

In some examples, the vehicle 100 may configure a short random path within the range of the detected environment information, i.e., in the detection range of the sensor and then be driven along the short random path. On the other hand, the vehicle 100 can receive all surrounding environment information and map data through the communication device 400 in advance, and then be driven after configuring a path based on the information and data. If a speed of the vehicle 100 moving in the second mode is significantly high, it may be difficult to appropriately perform an intended search for parking spaces. Thus, the driving speed of the vehicle in the second mode may be set lower than that in the first mode, and if necessary, the driving speed in the second mode may be lowered up to the speed limit of the parking facility or space.

Since the vehicle 100 can detect and determine available parking spaces using a sensor, that is, the object detection device 300, the path or steering of the vehicle 100 should be controlled during the autonomous driving in the second mode such that the parking spaces are included in the detection range of the sensor. In addition, it is desirable that the detection range of the sensor includes parking spaces as many as possible. That is, in this case, since a number of parking spaces may be discovered at once, the available parking spaces can be detected efficiently.

In some examples where the detection range of the sensor may be fixed, it is desirable that the vehicle 100 is driven alongside parking spaces to include parking space in the fixed detection range of the sensor as many as possible. Thus, as illustrated schematically in FIGS. 18, 19, and 20, during the autonomous driving in the second mode, the path or steering of the vehicle 100 can be controlled such that the vehicle 100 is driven alongside nearby parking spaces.

Moreover, to use limited spaces in the parking facility, parking spaces can be arranged in a prescribed form, pattern, or manner. For example, the parking spaces may be arranged at one side of the lane, that is, at one side of the vehicle 100 moving in the lane. On the contrary, the parking spaces may be arranged at both sides of the lane, that is, at both sides of the vehicle 100 moving along the lane. Thus, driving of the vehicle 100 (e.g., determining a path and steering along the path) can be controlled according to the parking space arrangement to continuously include the parking spaces in the sensor range.

Figure 19:
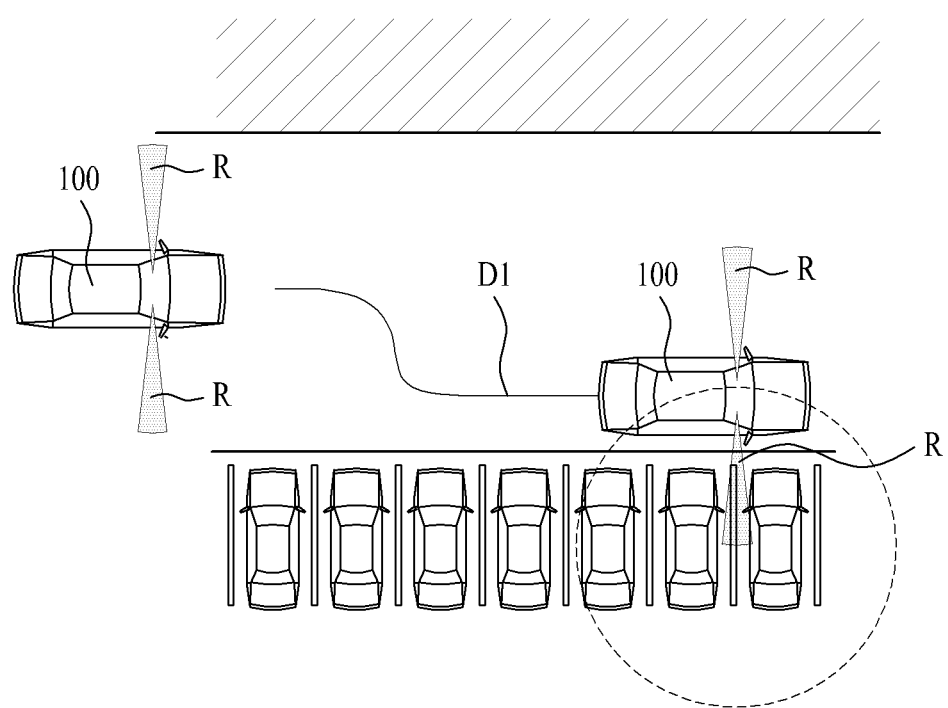
FIG. 19 is a schematic diagram illustrating an example of vehicle path control according to the second mode when example parking spaces are located at one side of an example vehicle.
Figure 20:
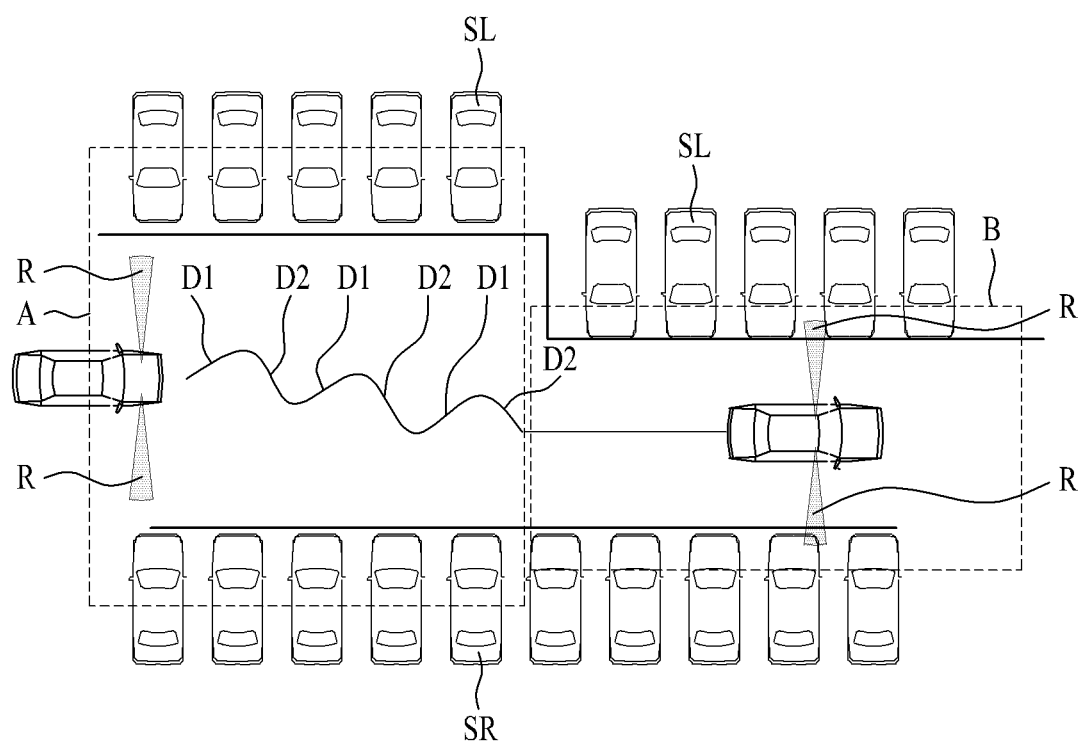
FIG. 20 is a schematic diagram illustrating an example of vehicle path control according to the second mode when parking spaces are located at both sides of an example vehicle.

In some examples, the parking space arrangement may be considered for the purpose of driving alongside the parking spaces. Thus, the path/steering control, i.e., driving in the second mode where the parking space arrangement is considered will be described in detail with reference to the relevant drawings. FIG. 19 illustrates an example of vehicle path control according to the second mode when parking spaces are located at one side of the vehicle, and FIG. 20 illustrates an example of vehicle path control according to the second mode when parking spaces are located at both sides of the vehicle.

First, as shown in FIG. 17, the vehicle may detect and determine how nearby parking spaces are arranged [S220 and S230]. In the detection and determination steps S220 and S230, the vehicle 100 can detect the nearby parking spaces using the sensor (e.g., the object detection device 300) and then determine the parking space arrangement based on detected parking spaces as described above.

If the vehicle 100 determines that parking spaces are arranged at one side of the vehicle 100 [S230] as shown in FIG. 19, the vehicle 100 may be driven alongside the parking spaces located at one side [D1 and S231]. Generally, parking spaces can be arranged along one side of a lane in parallel and perpendicular to a driving direction of the lane. In addition, although not shown in the drawing, parking spaces can be arranged along one side of a lane in parallel with the driving direction of the lane. Thus, in the case of the driving D1, the vehicle 100 may move along one side of the lane (or path) close to the parking spaces. In other words, the vehicle 100 may be driven alongside the parking spaces.

In some examples, during the driving D1, the vehicle 100 may maintain a predetermined minimum distance from the parking spaces for the purpose of the safety, and thus move along a straight line without steering changes. However, the steering of the vehicle 100 may be changed while the vehicle 100 is driven alongside the parking spaces [M] for several reasons. For example, the steering of the vehicle 100 may be changed due to a slight change in the parking space arrangement, that is, it may be changed when a certain one among the parking spaces is protruded or there is an object in front of a parking space.

In some implementations, the vehicle 100 may determine that parking spaces are arranged at both sides of the vehicle 100 [S230] as shown in FIGS. 18 and 20. Referring to FIG. 20, parking spaces SL and SR may be arranged at both sides of the vehicle 100 or the lane where the vehicle 100 move. In detail, the first park spaces SL may be arranged close to one of the two sides of the vehicle 100 (e.g., lane or path). In addition, the second parking spaces SR may be arranged close to the other of the two sides of the vehicle 100 (e.g., lane or path), that is, in the opposite side of the first parking spaces SL.

For example, the first and second parking spaces SL and SR may be respectively arranged at the two opposite sides of the lane. In this case, whether the parking space at the two sides are simultaneously include in the sensor's detection range can be determined [S240]. For example, to detect objects at the both sides of the vehicle 100, the detection range R may be extended in lateral directions of the vehicle 100, and more specifically, in directions perpendicular to the centerline of the vehicle 100 As described with reference to FIG. 12.

If the both parking spaces at the both sides of the lane are not simultaneously included in the detection range R of the sensor, the vehicle 100 may have difficulties in search the entire parking spaces SL and SR efficiently. For example, either the parking spaces SL or parking spaces SR may be included in the detection range R of the sensor, or the parking spaces SL and parking spaces SR may not be included in the detection range R. In this case, the parking spaces SL and parking spaces SR may not be detected, or either the parking spaces SL or parking spaces SR may be detected. Thus, driving of the vehicle 100 (e.g., determining the path or steering the vehicle 100) should be controlled such that all the parking spaces SL and SR are included in the sensor range R of the vehicle 100, that is, all the parking spaces SL and SR are detected.

As shown in FIG. 20, when it is determined that the parking spaces SL and SR at the both sides of the vehicle 100 are not included in the detection range R of the sensor at the same time, the vehicle 100 may be driven alternately alongside the parking spaces SL and alongside the parking spaces SR [S241]. In other words, the vehicle 100 may be driven alternately alongside one side of the lane (or path) adjacent to the parking spaces and alongside the other side of the lane. For example, such driving may be performed in an area A where a distance between the parking spaces SL and SR is greater than the sensor's detection range R.

For example, the vehicle 100 may first perform first driving D1 toward the first parking spaces SL. For the first driving D1, the vehicle 100 can be steered such that it is oriented toward the first parking spaces SL. Through the steering, the vehicle 100 may be oriented such that while facing the first parking places SL, the vehicle 100 has a certain angle with the centerline O parallel with the length direction of the lane as shown in the drawing.

In addition, the vehicle 100 may be oriented such that while facing the first parking places SL, the vehicle 100 is parallel with the centerline of the parking places, that is, the vehicle 100 is roughly perpendicular to the centerline O parallel to the length direction of the lane. Based on the orientation, the vehicle 100 may approach the first parking spaces SL at a predetermined distance during the first driving D1. Here, the predetermined distance may be the minimum safety distance to the parking spaces. That is, the vehicle 100 may be located close to the first parking spaces SL through the first driving D1, and thus among the first parking spaces SL, many parking spaces can be included in the detection range R of the vehicle 100's sensor.

In some examples, the vehicle 100 may perform second driving D2 toward the second parking places SR. Similar to the first driving D1, the vehicle 100 can be steered such that it is oriented toward the second parking spaces SR. First, the vehicle 100 may turn around so that the vehicle 100 faces the second parking spaces SR opposite to the first parking spaces SL. Specifically, the vehicle 100 may be oriented such that while facing the second parking places SR, the vehicle 100 has a certain angle with the centerline O parallel with the length direction of the lane as shown in the drawing.

In some examples, the vehicle 100 may be oriented such that the vehicle 100 is parallel with the centerline of the parking places, that is, the vehicle 100 is roughly perpendicular to the centerline O parallel to the length direction of the lane. While maintain the orientation, the vehicle 100 may approach the second parking spaces SR at a predetermined distance during the second driving D2. Here, the predetermined distance may be the minimum safety distance. That is, the vehicle 100 may be located close to the second parking spaces SR through the second driving D2, and thus among the second parking spaces SL, many parking spaces can be included in the detection range R of the vehicle 100's sensor.

In some examples, as shown in the drawing, the first driving D1 and second driving D2 can be repeated alternately. In this case, the repeated first and second driving D1 and D2 may include turning around and relevant steering to be oriented toward the first and second parking spaces SL and SR. Consequently, the vehicle 100 may be driven around between the parking spaces SL and SR, and more specifically, move around in the space or lane between the parking spaces SL and SR by being driven in a zigzag manner or staggering.

In addition, the lane or space between the parking spaces SL and SR can be divided by the centerline O into two lanes, and driving in opposite directions can be allowed in two lanes. In this case, the vehicle 100 may perform the first and second driving D1 and D2 only in the lane corresponding to its driving direction. On the other hand, the vehicle 100 may perform the first and second driving D1 and D2 in the entire space between the first and second parking spaces SL and SR, regardless of the divided lanes. However, if another vehicle approaches in the opposite direction, the vehicle 100 may perform the first and second driving D1 and D2 only in the lane corresponding to its driving direction. If the vehicle disappears, the first and second driving D1 and D2 may be performed in the entire space between the parking spaces SL and SR.

In some implementations, the parking facility may include an intersection C as shown in FIG. 18. For example, the intersection C includes a wide lane or space and requires the vehicle 100 to change its direction. Thus, it may be difficult to search the vicinity of the intersection C overall using the sensor of the vehicle 100. For this reason, the vehicle 100 may repeatedly perform the first and second driving D1 and D2 at the intersection C. Further, while driving at the intersection C, the vehicle 100 may perform the first and second driving D1 and D2 to perform a more detailed search without determination of whether nearby parking spaces are actually included in the detection range of the vehicle 100's sensor.

Figure 21:
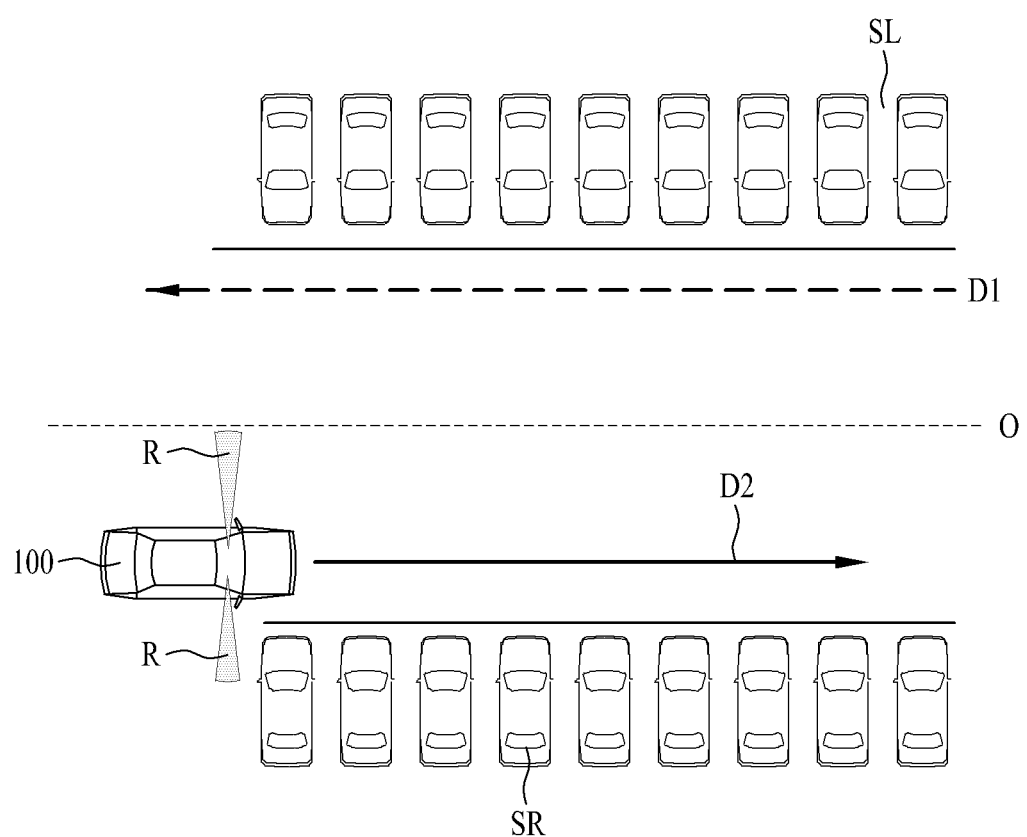
FIG. 21 is a schematic diagram illustrating another example of vehicle path control according to the second mode when parking spaces are located at both sides of an example vehicle.

In some examples, when determining that the first and second parking spaces SL and SR are not simultaneously included in the sensor's detection range as shown in FIG. 21, the vehicle 100 may be driven alongside the parking spaces SR arranged adjacent to one side of the lane or vehicle 100 and then be driven alongside the parking spaces SL arranged adjacent to the other side of the lane or vehicle 100 [S242]. For example, the driving described in FIG. 21 may be performed in the area A of FIG. 20 where the distance between the parking spaces SL and SR is greater than the sensor's detection range R.

In detail, the vehicle 100 may perform the first driving D1, which means driving alongside the first parking spaces SL. In the case of the first driving D1, the vehicle 100 can move alongside the first parking spaces SL along one side of a lane (or path), and thus be driven alongside the parking spaces. In addition, during the first driving D1, the vehicle 100 may maintain a predetermined minimum distance from the parking spaces for the purpose of the safety, and thus move along a straight line without steering changes. If the search of the first parking spaces SL through the first driving D1 is completed, the vehicle 100 may perform the second driving D2, which means driving alongside the second parking spaces SR.

In the second driving D2, the vehicle 100 can move along one side of a lane (or path) close to the second parking spaces SR while continuously maintaining the state of being close to the second parking places SR. In addition, during the second driving D2, the vehicle 100 may maintain a predetermined minimum distance from the parking spaces for the purpose of the safety, and thus move along a straight line without steering changes. If there are opposite direction lanes between the first and second parking spaces SL and SR, the first and second driving D1 and D2 may be performed in opposite directions as shown in the drawing.

Unlike the above-described examples, the vehicle 100 may determine that the parking spaces SL and SR are included in the sensor's detection range R at the same time [S240]. For example, referring to FIG. 20, the vehicle may pass through an area B where the distance between the parking spaces SL and SR is shorter than the sensor's detection range R. Since the vehicle 100 can search the parking spaces at the both sides of the vehicle 100, the vehicle 100 can move along a straight line without steering changes [S250]. However, as described above, the first and second driving D1 and D2 (S241 and S242) of FIGS. 20 and 21 are efficient in that a number of parking spaces are searched at one time. Thus, even when the parking spaces SL and SR are simultaneously included in the sensor's detection range R, first and second driving D1 and D2 (S241 and S242) of FIGS. 20 and 21 can be performed.

In some implementations, similar to the first mode, when the vehicle 100 detects an object in the vicinity thereof while being driven in the second mode, safety driving may not be guaranteed due to collision probability between the vehicle 100 and object. Such an object may include a moving object such as another vehicle and a static object. Thus, the autonomous driving according to the second mode S200 can be controlled by considering characteristics of the detected object, e.g., obstacle. Most of the expected object characteristics, and mode particularly, movement characteristics are considered in the driving according to the first mode and control steps thereof S130 and S132, the driving control in accordance with the respective movement characteristics described in the steps S130 and S132 can be equally applied to driving control in accordance with the corresponding movement characteristics in the second mode.

For example, in the case of the autonomous driving according to the second mode, determination of the movement characteristics (e.g., relative location, movement direction, or speed) of the different vehicle 100A shown in FIGS. 13A to 15B and driving (e.g., control of the path (steering) and speed) of the vehicle 100 based on the determination can be performed in the same manner. That is, similar to the first mode, in the case of the second mode, if the vehicle 100 detects the approach of the object, the vehicle 100 can first stop. Thereafter, if the object passes by the vehicle 100, the vehicle restarts driving. In addition, the vehicle 100 may move away from the object to avoid the approaching object before or after the vehicle 100 stops, and the movement may be selectively performed. In the first mode, the vehicle 100 can be driven to the target parking position along the pre-configured or modified path after the object passes by the vehicle 100.

Figure 22:
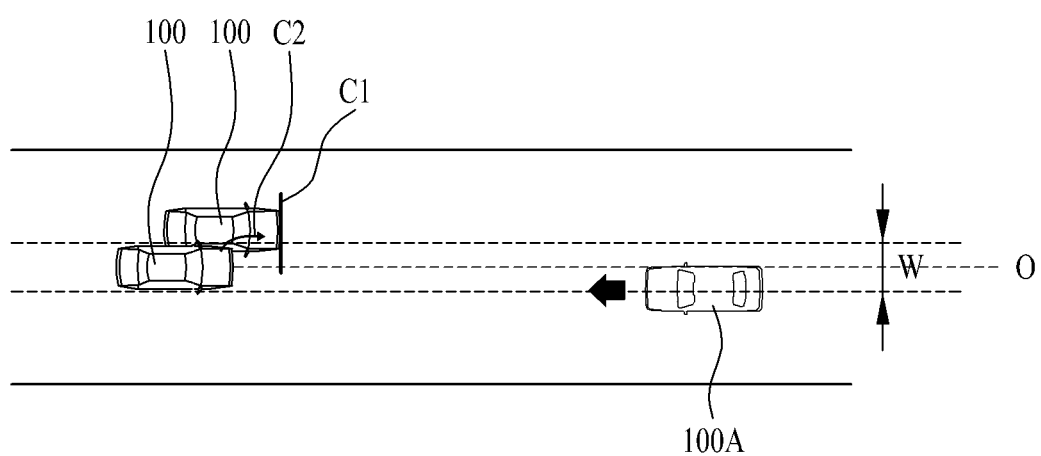
FIG. 22 is a schematic diagram illustrating an example of vehicle path control according to the second mode when an example object approaches an example vehicle.

In the second mode, the vehicle 100 can restart the first and second driving D1 and D2 shown in FIGS. 19 to 21, that is, apply a predetermined driving pattern for searching for available parking spaces after the approaching object passes by the vehicle 100. For example, when the different vehicle 100A approaches the vehicle 100 as shown in FIG. 22, the vehicle 100 may determine that a collision may occur between the different vehicle 100A and vehicle 100. That is, the vehicle 100 may determine that the different vehicle 100A and vehicle 100 are on the same line or their paths overlap with each other. Such determination may be made using the centerline O and widths of the vehicles 100 and 100A. Since details are the same as those described with reference to FIGS. 13A to 15B, it will not be described herein. In this case, the vehicle 100 can immediately stop to minimize the collision probability [C1]. In addition, the vehicle 100 may not change its steering until it stops [C1].

In some implementations, the vehicle 100 may move away from the different vehicle 100A before the stop [C1]. Such a movement may be performed after the stop [C1] by considering the movement characteristics of the different vehicle 100A. Thereafter, when the different vehicle 100A passes by the vehicle 100 without any collisions, for example, when the different vehicle 100A is out of the sensor range of the vehicle 100 and thus is not detected any more, the vehicle 100 may perform the first and second driving D1 and D2 shown in FIGS. 19 to 21 to search for parking spaces. According to the above-described autonomous driving control for avoiding an approaching object, the vehicle can safely perform the autonomous driving according to the second mode.

While the vehicle 100 is driven in the second mode [S210 to S250] as described above, the control unit 170 thereof can determine whether an available parking space can be secured [S260]. While the vehicle 100 is driven according to the second mode, the determination step S260 can be continuously performed to secure the available parking space rapidly. Regarding such determination, conditions that make parking spaces available, that is, conditions for defining availability of the parking spaces can be predetermined as second conditions.

Figure 23C:
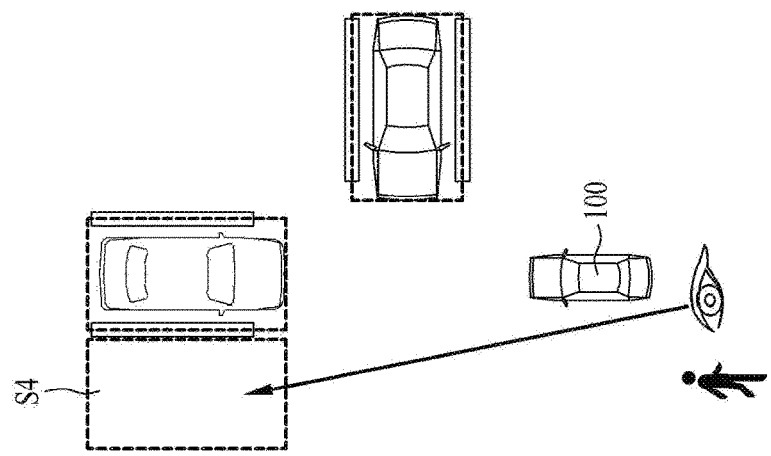
FIGS. 23A to 23C are schematic diagrams illustrating examples of second conditions for switching to the first mode of FIG. 17.
Figure 23B:
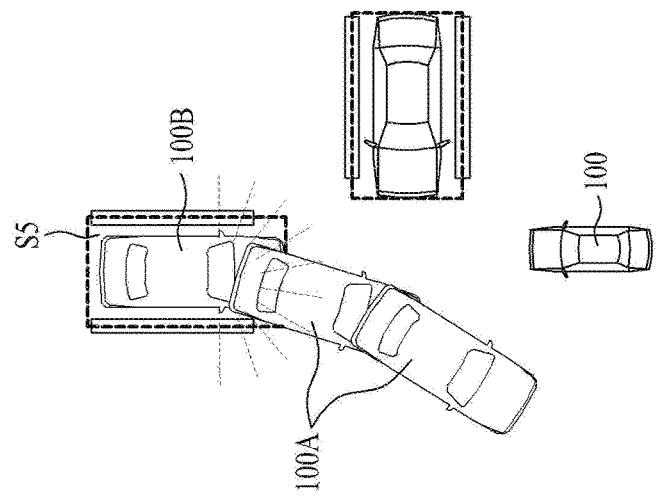
Figure 23A:
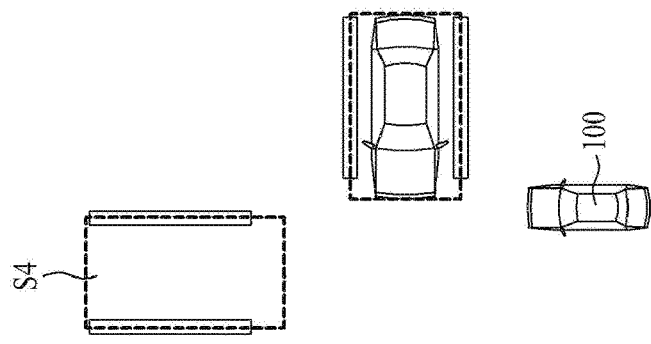

Since the available parking space may be set to the target parking position for the first mode, the second conditions may be considered as conditions for enabling the configuration of the target parking position. Similar to the first conditions, the second conditions can be stored in the memory 140 and used by the control unit 170 in determining availability of a parking position. FIGS. 23A to 23C illustrate examples of second conditions for switching to the first mode of FIG. 17. Hereinafter, a description will be given of the determination step S260 with reference to FIGS. 10 and 16A to 16C.

First, if it is determined in the determination step S260 that there is no available parking space, that is, it is determined that the second conditions are not satisfied, the vehicle 100 can continuously and repeatedly perform autonomous driving in the second mode [S210 to S250] to secure the available parking space.

On the other hand, while the vehicle 100 is autonomously driven in the second mode, the vehicle 100 may determine that the available parking space is secured. To this end, the examples of FIGS. 23A to 23C can be used as the second conditions. First, the vehicle 100 may detect an empty space S4 using the sensor as shown in FIG. 23A. In addition, the user may directly designate or select a prescribed parking space S4 as shown in FIG. 23B. In particular, as described in the configuration step S30, the user may instruct the vehicle 100 to park and designate the parking space S4 within or outside the vehicle 100. In detail, the dedicated parking space where only the user is allowed to park may be designated by the user or vehicle 100 (e.g., the control unit 170).

In some examples, the user may check an empty space with eyes and then designate as the parking space S4 the checked space. Further, the user or vehicle 100 (e.g., the control unit 170) may designate as the parking space S4 a space for accommodating the vehicle 100 even though it is not set as a parking space. For example, the parking facility may include an empty space enough for parking although it is not defined as the parking space by a line, and such a space may be designated for temporary parking. In this case, it can be determined that the parking space S4 satisfies the second conditions.

In addition to the instantaneously available parking space shown in FIGS. 23A and 23B, the vehicle 100 can detect a potentially available parking space S5 as shown in FIG. 23C, and in this case, the vehicle 100 can determined that the available parking space is secured, that is the second conditions are satisfied. Such a potentially available parking space S5 may imply a parking space that is not currently available (free or empty) but will be available in near future or that has a high probability of being used. For example, as shown in FIG. 23C, the vehicle 100 can detect that a different vehicle 100A that moves out of the parking space S5. In this case, the vehicle can determine that the parking space S5 is currently being emptied and has certainty of availability.

In some examples, the vehicle 100 can detect a different vehicle 100B with a high probability of moving out of the parking space S5 in future and emptying the parking space S5. For example, the vehicle 100 may detect an engine sound of the different vehicle 100B and expect that the corresponding vehicle 100B will leave from the parking space S5 soon. Moreover, the vehicle 100 may expect the departure of the different vehicle 100B by detecting a signal for instructing operation of the corresponding vehicle 100B, for example, a signal for starting the corresponding vehicle 100B or a signal for releasing door lock.

In some implementations, the vehicle 100 may detect that the engine of the different vehicle 100B is heated through a thermal image of the different vehicle 100B, and it may also detect that a person is in the different vehicle 100B through an image of the corresponding vehicle 100B. That is, from the image analysis results, the vehicle 100 may detect that the different vehicle 100B will leave soon. Further, if the vehicle 100 obtains image analysis results after detecting the engine sound or signal for instructing operation, the vehicle 100 may confirm that the different vehicle 100B will leave soon. Accordingly, by detecting the above-mentioned situations, the vehicle 100 can check the potentially available parking space S5, i.e., parking space with availability.

When it is determined in the determination step S260 that the second conditions are satisfied, that is, it is determined that the instantaneously available parking space S4 and/or potentially available parking space S5 are secured, the available parking spaces S4 and S5 can be set to target parking positions. In addition, as shown in "A" of FIGS. 17 and 8, autonomous driving of the vehicle 100 can be switch from the second mode to the first mode [S100]. That is, when the second conditions are satisfied, the vehicle 100 can be autonomously driven to the set target parking positions S4 and S5 according to the predetermined first mode (S110 to S130). Next, until the vehicle 100 is parked, the autonomous driving mode of the vehicle 100 can switch between the first and second modes according to determination based on the first and second conditions.

As described above, the configuration step S30 and determination steps S260 share the same purpose and function to configure the target parking position from available parking spaces. Thus, the second conditions of the determination step S260 can be equally applied to the configuration step S30 where the target parking position is set at the start of parking. In the configuration step S30, since determination about the instantaneously available parking space is already performed, the target parking position may be configured based on determination about the potentially available parking space. Thus, when the vehicle 100 starts parking, the vehicle 100 may configure the target parking position by considering both the instantaneously and potentially available parking spaces. When the target parking position is configured, the vehicle 100 may be driven according to the first mode [S100] to the configured target parking.

Figure 24:
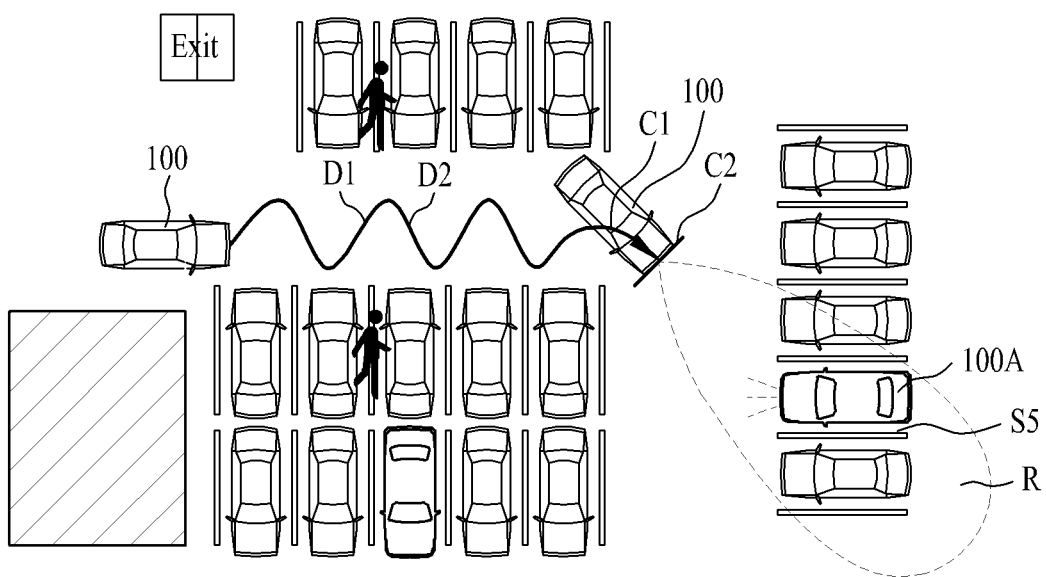
FIG. 24 is a schematic diagram illustrating an example of vehicle control when an example potentially available parking space is discovered based on the second condition.

In some implementations, when the vehicle 100 is driven according to the first mode [S100] to the target parking position corresponding to the potentially available parking position, the target parking position may not be empty until the vehicle 100 arrives at the target parking position. In this case, since it could be interpreted as satisfaction of the first conditions, the vehicle 100 may switch to the autonomous driving according to the second mode S200. In some cases, such switch may not be preferable because unnecessary first-mode driving is accompanied. FIG. 24 is a schematic diagram illustrating an example of vehicle control when a potentially available parking space is discovered based on the second condition. Hereinafter, regarding a potentially available parking space, a description will be given of additional driving control in the second mode with reference to FIG. 24.

As shown in FIG. 24, the vehicle 100 may detect a potentially available parking space S5 while performing the first and second driving D1 and D2 described in FIGS. 19 to 21. In this case, the vehicle 10 may be oriented to the parking space S5 [C1], instead of immediately switching to the first mode and performing driving according to the first mode [S100]. In detail, the orientation of the vehicle 100 may be adjusted such that the parking space S5 may be continuously included in a detection range of at least one sensor disposed on the vehicle 100. After the orientation of the vehicle 100 [C1], the vehicle 100 may wait for a predetermined time. That is, the vehicle 100 may stop during sufficient time for the parking space S5 to be empty. If the parking space S5 is empty within the predetermined time, the parking space S5 is set to the target parking position, and the driving mode of the vehicle 100 can switch to the first mode.

Thereafter, a path to the parking space S5 is configured, and then the vehicle 100 may rapidly move along the configured path according to a predetermined speed scheme. However, when it is detected or determined that the parking space S5 will not be empty within the predetermined time, that is, the parking space S5 is not instantaneously available, the vehicle 100 may discard the parking space S5 and then perform the first and second driving D1 and D2 described in FIGS. 19 to 21 to search for another available parking space. The above-described driving control in the second mode can prevent unnecessary first-mode driving related to the potentially available parking space S5, and thus the vehicle 100 can be autonomously driven for more efficient parking.

The autonomous vehicle and method for controlling the same according to the present disclosure has the following effects and features.

The vehicle and control method for the same according to the present disclosure can operate in either the first mode or second mode according to whether the target parking position is set during autonomous driving. The first mode is configured to move the vehicle to the target parking position safely and rapidly by optimally controlling a speed of the vehicle based on characteristics of the configured path.

The second mode may be configured to search for available parking spaces rapidly and efficiently by configuring a path optimized for the parking space search in consideration of the structures of the parking facility and parking spaces. Therefore, according to the vehicle and control method for the same according to the present disclosure, it is possible to control vehicle driving for autonomous parking by coping with changing environments and conditions in an active manner. For this reason, the vehicle and control method for the same according to the present disclosure can perform autonomous parking more efficient and accurate than manual parking by a user.

In addition, according to the vehicle and control method for the same of the present disclosure, the vehicle control mode can switch between the first and second mode based on conditions regarding whether the target parking position can be maintained or should be reconfigured, that is, first and second conditions respectively for unavailability availability of parking spaces. Since the first and second conditions reflect situation that can be actually considered, they can be used to determine whether the parking spaces are available or unavailable. Hence, according to the vehicle and control method for the same of the present disclosure, autonomous parking can be performed efficiently and accurately by coping with changing environments and conditions actively.

It will be appreciated by persons skilled in the art that the effects that can be achieved through the present disclosure are not limited to what has been particularly described hereinabove and other advantages of the present disclosure will be more clearly understood from the following appended claims.

Implementations described above may be implemented as computer-readable code on a program-recorded medium. The computer-readable medium may include one or more recording devices in which data readable by a computer system may be stored. Examples of the computer-readable medium include a hard disk drive (HDD), solid-state disk (SSD), silicon disk drive (SDD), ROM, RAM, CD-ROM, magnetic tape, floppy disk, and optical data storage. Alternatively, implementations may be implemented in the form of a carrier wave (e.g., transmission over the Internet). In addition, the computer may include the processor 270 or the controller 170. Although some implementations have been disclosed for illustrative purposes, various modifications, additions and substitutions are possible, without departing from the scope and spirit of the disclosure as disclosed in the accompanying claims.

What is claimed is:

1. A method for controlling autonomous driving of a vehicle, the method comprising:
    detecting, by a sensor of the vehicle, an environment around the vehicle;
    autonomously driving, by at least one processor connected to the vehicle, the vehicle based on the detected environment;
    determining whether a target parking position has been set;
    based on a determination whether the target parking position has been set, determining, by the at least one processor, an autonomous driving mode of the vehicle from among a first mode for controlling a speed of the vehicle to move the vehicle to the target parking position and a second mode for searching for an available parking position;
    based on a determination of the autonomous driving mode from among the first mode and the second mode, autonomously driving, by the at least one processor, the vehicle in one of the first and second modes;
    based on autonomously driving the vehicle in one of the first and second modes, determining whether a predetermined condition is satisfied; and
    based on a determination that the predetermined condition is satisfied, switching, by the at least one processor, the autonomous driving mode to the other of the first and second modes,
    wherein switching the autonomous driving mode comprises:
        based on satisfaction of a first condition in which the target parking position is unavailable for parking the vehicle, switching the autonomous driving mode from the first mode to the second mode, and
        based on satisfaction of a second condition in which the target parking position is available for parking the vehicle, switching the autonomous driving mode from the second mode to the first mode, and
    wherein the first condition comprises at least one of:
        a condition in which the target parking position is occupied by another object,
        a condition in which a parking path to the target parking position is unavailable,
        a condition in which a number of attempts for parking the vehicle at the target parking position is outside of a predetermined number of times, or
        a condition in which a period of time elapsed for attempts for parking the vehicle at the target parking position is outside of a predetermined period of time.

2. The method of claim 1, wherein determining the autonomous driving mode from among the first mode and the second mode comprises:
    based on a determination that the target parking position has been set, determining the first mode as the autonomous driving mode; and
    based on a determination that the target parking position has not been set, determining the second mode as the autonomous driving mode.

3. The method of claim 1, wherein the target parking position comprises a first parking space that is currently available for parking the vehicle and a second parking space that is anticipated to be available for parking the vehicle.

4. The method of claim 1, wherein autonomously driving the vehicle in one of the first and second modes comprises autonomously driving the vehicle in one of:
    the first mode based on a first driving speed and a first steering operation; and
    the second mode based on a second driving speed that is different from the first driving speed and a second steering operation that is different from the first steering operation.

5. The method of claim 1, wherein autonomously driving the vehicle in the first mode comprises:
    determining a parking path to the target parking position; and
    autonomously driving the vehicle along the parking path based on changing the speed of the vehicle according to a change of a steering operation of the vehicle.

6. The method of claim 1, wherein autonomously driving the vehicle in the first mode comprises:
    determining a parking path to the target parking position; and
    autonomously driving the vehicle along the parking path based on changing the speed of the vehicle according to a width of the parking path.

7. The method of claim 6, wherein autonomously driving the vehicle based on changing the speed of the vehicle according to the width of the parking path comprises:
    increasing the speed of the vehicle based on an increase of the width of the parking path to the target parking position; and
    decreasing the speed of the vehicle based on a decrease of the width of the parking path to the target parking position.

8. The method of claim 1, wherein autonomously driving the vehicle in the first mode comprises:
    determining a parking path to the target parking position;
    determining whether a width of the parking path is less than a reference width;
    autonomously driving the vehicle along the parking path based on a steering operation of the vehicle;
    based on maintaining the steering operation of the vehicle, autonomously driving the vehicle at a first speed;
    based on maintaining the steering operation of the vehicle and based on a determination that the width of the parking path is less than the reference width, autonomously driving the vehicle at a second speed that is less than the first speed; and
    based on a change of the steering operation of the vehicle, driving the vehicle at a third speed that is less than the first and second speeds.

9. The method of claim 1, wherein autonomously driving the vehicle in the first mode comprises searching, by the sensor, for available parking spaces that are located on a way to the target parking position.

10. The method of claim 1, wherein autonomously driving the vehicle in the second mode comprises autonomously driving the vehicle along a side of parking spaces that are located within a detection range of the sensor.

11. The method of claim 1, wherein autonomously driving the vehicle in the second mode comprises:
   determining whether parking spaces are present at a first side of the vehicle and a second side of the vehicle; and
   based on a determination that the parking spaces are present at the first and second sides of the vehicle, autonomously driving the vehicle based on alternating a movement path of the vehicle between a first path that is closer to parking spaces at the first side of the vehicle and a second path that is closer to parking spaces at the second side of the vehicle.

12. The method of claim 1, wherein autonomously driving the vehicle in the second mode comprises:
   determining whether parking spaces are present at a first side of the vehicle and a second side of the vehicle;
   based on a determination that the parking spaces are present at both of the first and second sides of the vehicle, determining whether the parking spaces at both of the first and second sides of the vehicle are within in a detection range of the sensor; and
   based on a determination that the parking spaces at both of the first and second sides of the vehicle are within the detection range of the sensor, maintaining a steering operation of the vehicle while autonomously driving the vehicle.

13. The method of claim 1, wherein the second condition comprises at least one of:
   a detection of an empty space at the target parking position; or
   a designation of a predetermined parking space at the target parking position.

14. The method of claim 13, wherein the second condition further comprises a detection of a potential parking space that is anticipated to be available for parking the vehicle.

15. The method of claim 14, wherein the potential parking space comprises at least one of a parking space from which another vehicle is currently leaving or a parking space that is anticipated to be available within a wait time.

16. The method of claim 14, wherein switching the autonomous driving mode further comprises:
   based on a detection of the potential parking space before switching the autonomous driving mode from the second mode to the first mode, orienting the vehicle to the potential parking space to include the potential parking space in a detection range of the sensor.

17. The method of claim 16, wherein autonomously driving the vehicle in the second mode comprises:
   stopping the vehicle around the potential parking space for a predetermined time; and
   determining whether the potential parking space is available within the predetermined time;
   based on a determination that the potential parking space is unavailable within the predetermined time, restarting autonomously driving the vehicle along a predetermined path to search for another parking space.

18. The method of claim 1, further comprising:
   based on a determination that the target parking position has been set, determining whether the vehicle is located within a distance from the target parking position; and
   based on a determination that the vehicle is located within the distance from the target parking position, autonomously parking the vehicle at the target parking position without autonomously driving the vehicle in the first mode.

* * * * *